United States Patent
Takano

(10) Patent No.: US 10,506,470 B2
(45) Date of Patent: Dec. 10, 2019

(54) CONTROL DEVICE, BASE STATION, TERMINAL DEVICE, AND CONTROL METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/564,324

(22) PCT Filed: Apr. 13, 2016

(86) PCT No.: PCT/JP2016/061931
§ 371 (c)(1),
(2) Date: Oct. 4, 2017

(87) PCT Pub. No.: WO2016/199494
PCT Pub. Date: Dec. 15, 2016

(65) Prior Publication Data
US 2018/0139654 A1    May 17, 2018

(30) Foreign Application Priority Data

Jun. 9, 2015    (JP) ................................ 2015-116783

(51) Int. Cl.
*H04W 28/14* (2009.01)
*H04W 76/10* (2018.01)
(Continued)

(52) U.S. Cl.
CPC ............. *H04W 28/14* (2013.01); *H04L 67/04* (2013.01); *H04L 67/1095* (2013.01);
(Continued)

(58) Field of Classification Search
CPC . H04W 28/0226; H04W 28/12; H04W 28/14; H04W 28/26; H04W 36/0011;
(Continued)

(56) References Cited

U.S. PATENT DOCUMENTS

2010/0002610 A1*  1/2010  Bowser .................. G06F 1/3203
                                                              370/311
2014/0153504 A1*  6/2014  Wang .................... H04W 28/14
                                                              370/329
(Continued)

FOREIGN PATENT DOCUMENTS

JP    2014-515222 A    6/2014
JP    2014-531810 A    11/2014
WO    2010/026799 A1    3/2010

OTHER PUBLICATIONS

International Search Report dated Jul. 5, 2016, in PCT/JP2016/061931 filed Apr. 13, 2016.

(Continued)

*Primary Examiner* — Kan Yuen
(74) *Attorney, Agent, or Firm* — Xsensus LLP

(57) ABSTRACT

[Object] To provide a control device, base station that reduces the response time of UE by determining a base station in which data on an application is held in advance and by causing the determined base station to hold the data.

[Solution] There is provided a control device including: a control unit configured to determine a base station from among a plurality of base stations on the basis of a predetermined condition, the base station causing data on an application used by a terminal device to be linked, the terminal device wirelessly communicating with the base station; and a notification unit configured to notify all base stations determined by the control unit that the data is caused to be linked.

10 Claims, 25 Drawing Sheets

(51) Int. Cl.
*H04W 28/02* (2009.01)
*H04W 36/00* (2009.01)
*H04L 29/08* (2006.01)
*H04L 29/06* (2006.01)
*H04W 28/12* (2009.01)
*H04W 28/26* (2009.01)
*H04W 36/32* (2009.01)
*H04W 52/02* (2009.01)

(52) U.S. Cl.
CPC .......... *H04L 67/2842* (2013.01); *H04L 67/38* (2013.01); *H04W 28/0226* (2013.01); *H04W 36/0011* (2013.01); *H04W 76/10* (2018.02); *H04L 67/12* (2013.01); *H04W 28/12* (2013.01); *H04W 28/26* (2013.01); *H04W 36/32* (2013.01); *H04W 52/0206* (2013.01); *Y02D 70/1262* (2018.01); *Y02D 70/1264* (2018.01); *Y02D 70/142* (2018.01); *Y02D 70/164* (2018.01); *Y02D 70/166* (2018.01); *Y02D 70/21* (2018.01); *Y02D 70/22* (2018.01)

(58) Field of Classification Search
CPC . H04W 36/32; H04W 48/20; H04W 52/0206; H04W 76/10
See application file for complete search history.

(56) References Cited

U.S. PATENT DOCUMENTS

| | | | |
|---|---|---|---|
| 2015/0085746 A1* | 3/2015 | Somayazulu | H04W 48/08 370/328 |
| 2015/0146664 A1* | 5/2015 | Kobayashi | H04W 72/08 370/329 |
| 2017/0282075 A1* | 10/2017 | Michot | H04L 67/02 |

OTHER PUBLICATIONS

Bombaye Tamako, "Hakkutsu Otakara Game Review Kaso Yakyu". Gekkan Appli-Style, Oct. 2013, vol. 1, No. 11, 5 pages.

* cited by examiner

CONTROL DEVICE, BASE STATION, TERMINAL DEVICE, AND CONTROL METHOD

TECHNICAL FIELD

The present disclosure relates to a control device, a base station, a terminal device, and a control method.

BACKGROUND ART

With the development of mobile communication systems, the size of data to be processed by the mobile communication system has also increased. In related art, cache data referred to by a terminal device (user equipment; UE) has been located outside the radio access network (RAN) and evolved packet core (EPC). Thus, it takes time to refer to the cache data from the UE.

Thus, in recent years, a technique called the mobile edge computing (MEC) has been developed. The MEC is a technique in which cache data or an application is arranged in a base station (eNodeB), and so the cache data is referred to from UE or an application to be used by the UE are enabled (activated). Thus, it is possible to speed up the response time, which is the time from when an UE requests data to when it receives the data. Techniques related to the MEC are disclosed in, in one example, Patent Literatures 1 and 2, or the like.

CITATION LIST

Patent Literature

Patent Literature 1: JP 2014-531810T
Patent Literature 2: JP 2014-515222T

DISCLOSURE OF INVENTION

Technical Problem

However, in the MEC technique in related art, when the UE uses data that has never been used, data is not cached in a base station, and eventually a longer response time, which is the time taken from when UE requests data to when it receives the data, will be taken. Similarly, in a case where there is an application that is not activated in the base station, a longer response time will be taken until reception of the data even when the UE makes a request to the base station using the application.

In view of the above, the present disclosure provides a novel and improved control device, base station, terminal device, and control method, capable of reducing the response time of UE by determining a base station in which application-related data is held in advance and by causing the determined base station to hold the application-related data.

Solution to Problem

According to the present disclosure, there is provided a control device including: a control unit configured to determine a base station from among a plurality of base stations on the basis of a predetermined condition, the base station causing data on an application used by a terminal device to be linked, the terminal device wirelessly communicating with the base station; and a notification unit configured to notify all base stations determined by the control unit that the data is caused to be linked.

Further, according to the present disclosure, there is provided a base station including: an acquisition unit configured to acquire a notification that causes data on an identical application to be linked with another base station; and a control unit configured to cause the data to be linked with the other base station depending on a request from a terminal device on the basis of the notification acquired by the acquisition unit.

Further, according to the present disclosure, there is provided a terminal device including: a control unit configured to notify a core network of information on an application in which data is linked with another terminal device that communicates with a base station identical or different to or from a base station which communicates with the terminal device.

Further, according to the present disclosure, there is provided a control method including: determining a base station from among a plurality of base stations on the basis of a predetermined condition, the base station causing data on an application used by a terminal device to be linked, the terminal device wirelessly communicating with the base station; and notifying all determined base stations that the data is caused to be linked.

Advantageous Effects of Invention

According to the present disclosure as described above, it is possible to provide a novel and improved control device, base station, terminal device, and control method, capable of reducing the response time of UE by determining a base station in which data is held in advance and by causing the determined base station to hold the data.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
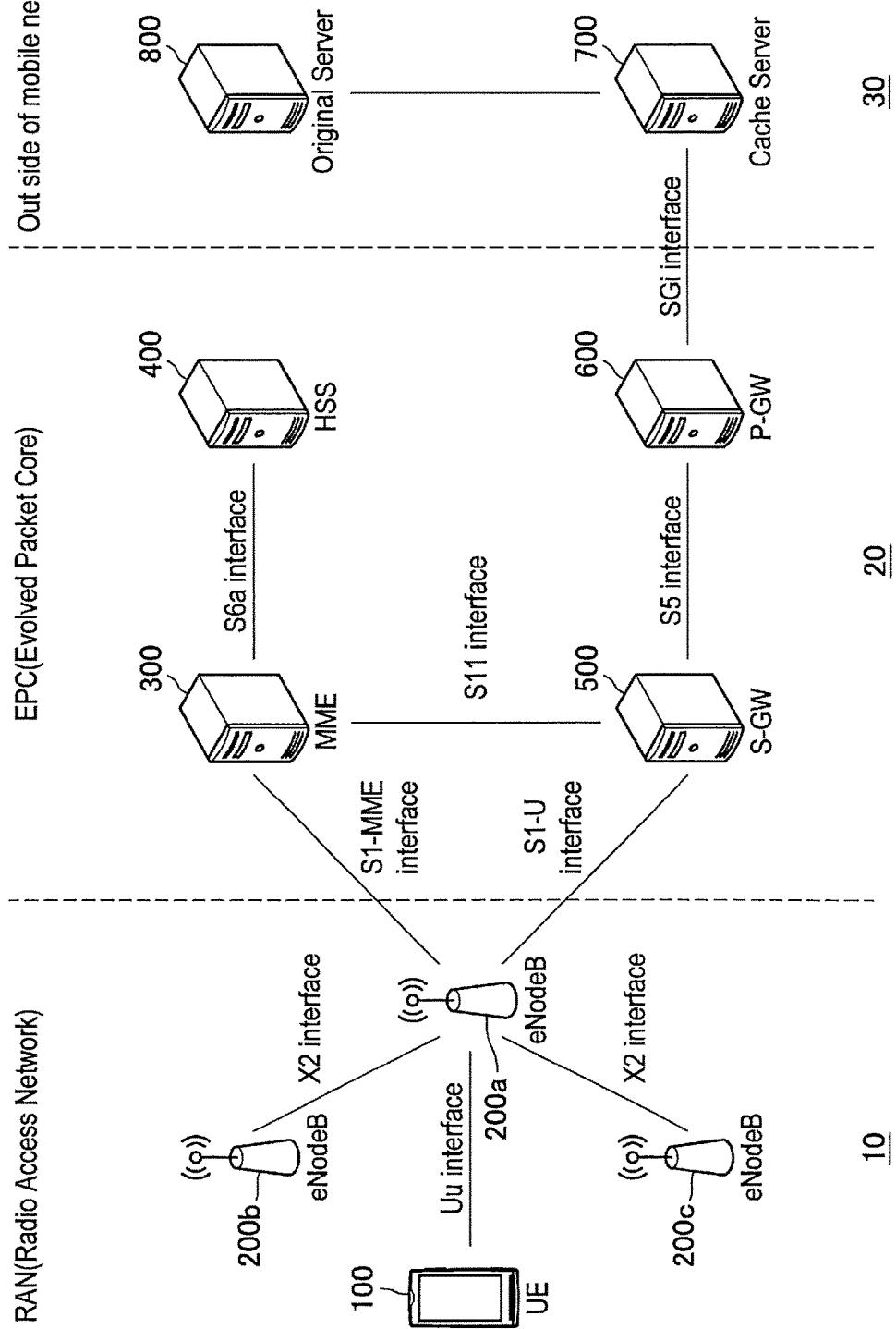
FIG. 1 is a diagram illustrated to describe a configuration example of a mobile network system to which the MEC is not applied.

Hereinafter, (a) preferred embodiment(s) of the present disclosure will be described in detail with reference to the appended drawings. In this specification and the appended drawings, components that have substantially the same function and structure are denoted with the same reference numerals, and repeated description of these components is omitted.

Moreover, description will be given in the following order.
1. Embodiment of present disclosure
1.1. System configuration example
1.2. Device configuration example
1.2.1. Configuration example of terminal device
1.2.2. Configuration example of base station
1.2.3. Configuration example of control entity
1.3. Operation example
2. Application examples
3. Concluding remarks

1. Embodiment of Present Disclosure

1.1. System Configuration Example

A configuration example of a system according to an embodiment of the present disclosure is now described.

Recent wireless communication environments are confronted with rapid increase in data traffic. Then, in response to the rapid increase in data traffic, the improvement of capability of wireless access has become urgent necessity.

As a technique for improving the capability of wireless access, the technique called MEC as described above is developed. The MEC is the technique in which cache data or an application is arranged in a base station (eNodeB) and so the cache data is referred to from UE, or an application to be used by the UE is enabled (activated). This speeds up the response time, which is the time taken from when the UE requests data to when it receives the data.

A mobile network system to which the MEC is not applied is compared to a mobile network system to which the MEC is applied to describe the effect obtained by the MEC. FIG. 1 is a diagram illustrated to describe a configuration example of the mobile network system to which the MEC is not applied. FIG. 1 illustrates a system including a radio access network (RAN) 10, an evolved packet core (EPC) 20, and a network 30, such as the Internet, outside the mobile network. The mobile network system illustrated in FIG. 1 is, in one example, a system compliant with LTE, LTE-Advanced, or other equivalent communication standards.

The RAN 10 illustrated in FIG. 1 is configured to include a terminal device (UE) 100 and eNodeBs 200a, 200b, and 200c. In the following description, in the case where there is no particular significance to distinguish among eNodeBs 200a, 200b, and 200c, they are simply referred to as an eNodeB 200.

The terminal device 100 is, in one example, any mobile device used by a user, such as a smartphone (a high-end mobile phone) or a tablet terminal. The eNodeB 200a, 200b, and 200c are individual base stations. Data is transmitted between the terminal device 100 and the eNodeB 200a via a Uu interface, and data is transmitted between the eNodeB 200a and the eNodeB 200b and between the eNodeB 200a and the eNodeB 200c, via an X2 interface. The X2 interface is used for data exchange upon handover and is used for the coordination of interference between eNodeBs.

The EPC 20 illustrated in FIG. 1 is configured to include a mobility management entity (MME) 300, a home subscriber server (HSS) 400, a serving gateway (S-GW) 500, and a packet data network gateway (P-GW) 600.

The S-GW 500 is an entity that is an anchor point for handover. The P-GW 600 allocates an IP address to the terminal device 100. In addition, the S-GW 500 provides an IP address to be accessed to the outside of the mobile network.

Data is transmitted between the MME 300 and the eNodeB 200a via an S1-MME interface, between the MME 300 and the HSS 400 via an S6a interface, and between the MME 300 and the S-GW 500 via an S11 interface. Data is transmitted between the S-GW 500 and the eNodeB 200a via an S1-U interface and between the S-GW 500 and the P-GW 600 via an S5 interface.

In the EPC, the control plane and the user plane are separated. The S-GW 500 and the P-GW 600 are mainly related to the user plane, and the MME 300 and the HSS 400 are related to the control plane. The S-GW 500 has a function of holding user data to be an anchor point of handover even in the configuration to which the MEC is not applied. On the other hand, the eNodeBs 200a, 200b, and 200c have no function of holding user data in related art but only have functions such as packet retransmission corresponding to the packet loss occurred in the Uu interface, and so neither cache data nor applications are arranged.

The network 30 illustrated in FIG. 1 is configured to include a cache server 700 used to store cache data and a server device 800 used to store actual data. Data is transmitted between the cache server 700 and the P-GW 600 via an SGi interface.

In the mobile network to which the MEC is not applied as illustrated in FIG. 1, the data to be cached is placed in the network 30 outside the RAN 10 and the EPC 20 of the mobile network. Thus, the delay from the terminal device 100 arranged in the area of the RAN 10 to the cache server 700 causes a response from the cache server 700 to a request of the terminal device 100 to be delayed.

An example of a request of the terminal device 100 includes a static data downloading request, such as downloading of an image or a movie, by accessing a hypertext transfer protocol (HTTP) server and a dynamic request, such as an operation on a specific application. Thus, it is natural that the response to a request is faster when cache data or application is arranged in an entity (e.g., eNodeB 200a in FIG. 1) near the terminal device 100.

Further, the delay depends on how far an entity passes through, rather than the distance between entities. In other words, the processing delay necessary for an input unit that inputs data, a processing unit that processes data, and an output unit that outputs data is added at each entity as many as the number of entities, so the delay of the response from the cache server 700 to the request of the terminal device 100 increases.

Figure 2:
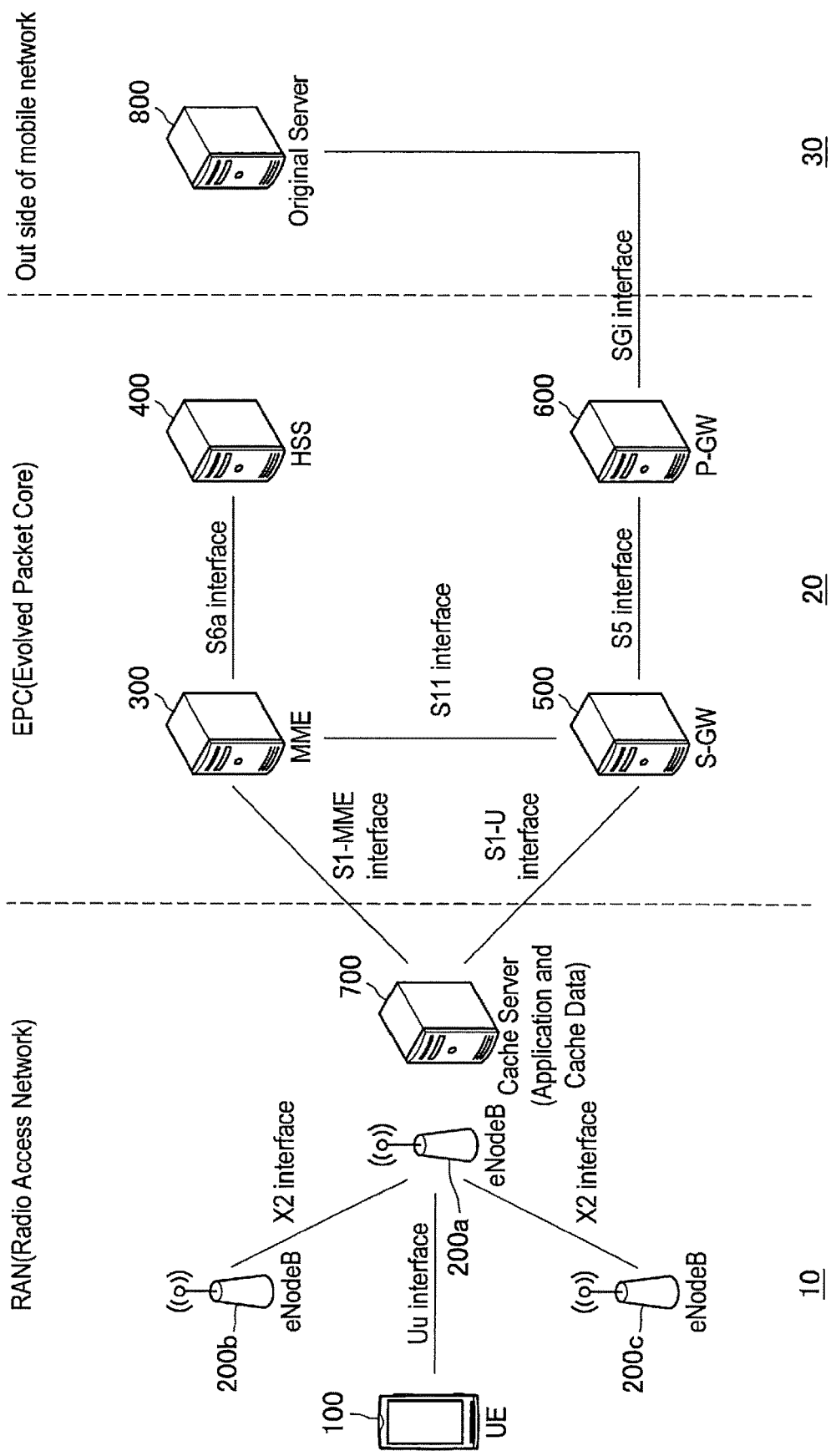
FIG. 2 is a diagram illustrated to describe a configuration example of a mobile network system to which the MEC is applied.

Thus, the cache data or application is arranged in the eNodeB, and so it can expected that the time of the response for the cache data to the request of the terminal device 100 is reduced. FIG. 2 is a diagram illustrated to describe a configuration example of a system of a mobile network to which the MEC is applied.

FIG. 2 illustrates a network configuration in which a cache server 700 for cache data and an application is arranged in the eNodeB 200a. The configuration illustrated in FIG. 2 reduces the number of entities existing between the terminal device 100 and the cache server 700 for cache data or an application. Thus, it can be expected for the mobile network illustrated in FIG. 2 to achieve a response from the cache server 700 to the request of the terminal device 100 in a short time.

Figure 3:
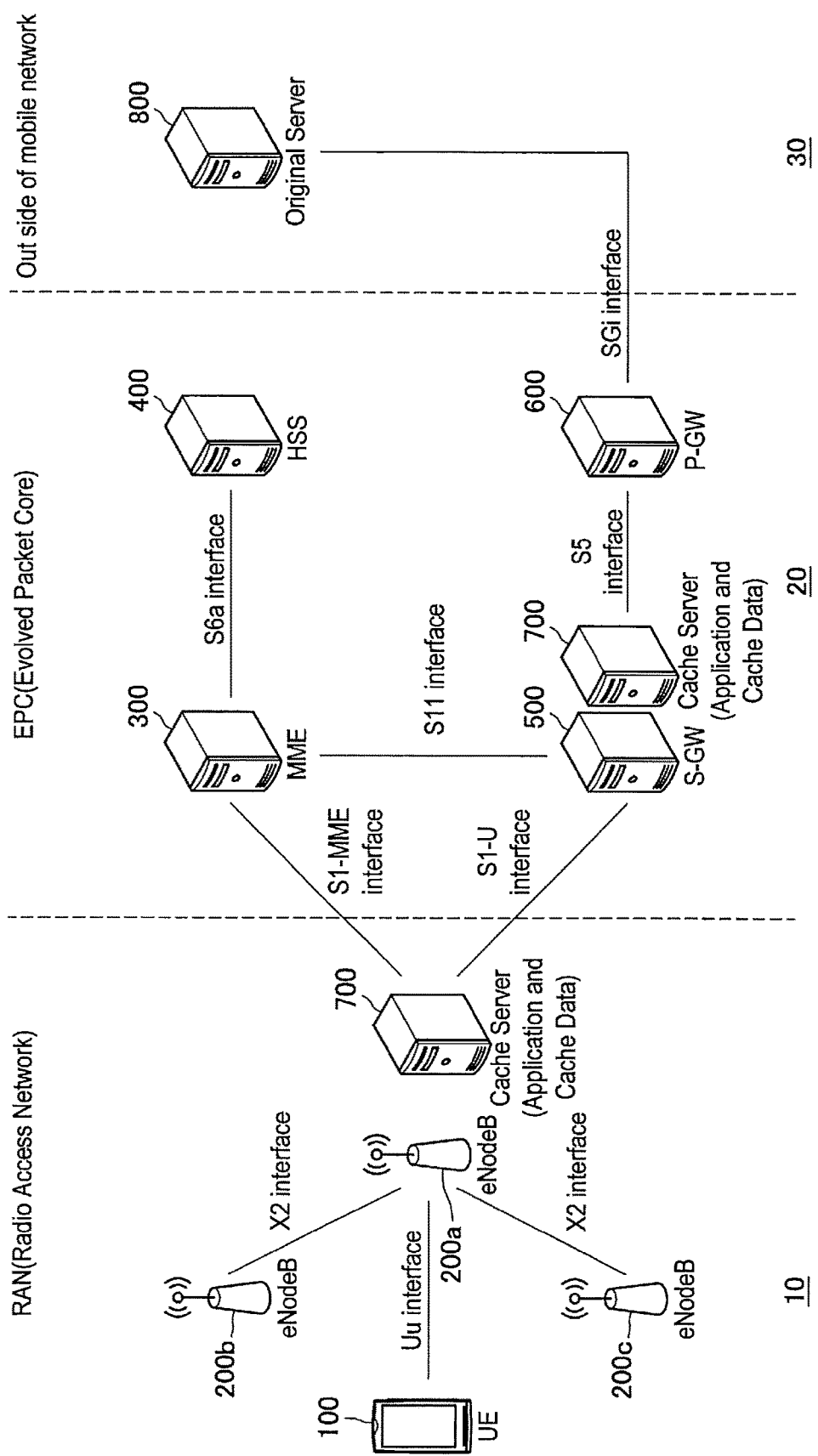
FIG. 3 is a diagram illustrated to describe a configuration example of a mobile network system to which the MEC is applied.

FIG. 3 is a diagram illustrated to describe a configuration example of a system of a mobile network to which the MEC is applied. FIG. 3 illustrates a configuration in which the cache server 700 is arranged in the eNodeB 200a and another cache server 700 is arranged in the S-GW 500. In a case where there is a request from the terminal device 100, if there is no cache data in the eNodeB 200a, the cache data stored in the S-GW 500 is used rather than fetching the original data from the server device 800. In this way, the cache server 700 is arranged in each of the eNodeB 200a and the S-GW 500, so it is expected that a response from the cache server 700 to the request of the terminal device 100 is achieved in a short time.

Even in the case where the cache server 700 transmits data, the cache data is recognized through the HTTP header, and so it is necessary for some applications that can be processed by HTTP to be activated by the eNodeB 200 (equipped with the function of the cache server 700). In addition, even in the case where a particular application is supplied to the terminal device 100, it is also necessary for the corresponding application to be arranged in the eNodeB 200 (equipped with the function of the cache server 700).

The application fails to be used in inactivated state (disabled) even in the state in which the application is arranged in the eNodeB 200. Thus, it is important for the application to be activated, that is, is ready for use, as well as to be arranged in the eNodeB 200.

The types of applications executed by the terminal device 100 are various, so it is a heavy burden for the eNodeB 200 (equipped with the function of the cache server 700) to keep all applications active (enabled state) at all times. Thus, it is reasonable for the eNodeB 200 to activate the application when the terminal device 100, which uses the application, appears.

Further, for the cache data, in the case where data is not cached in the cache server 700 even if the cache server 700 is active, it may be necessary to fetch data eventually from the server device 800 in which the original data is stored.

Some applications may be necessary to keep their states in synchronization with each other by exchanging their internal states after the application is in an active state. In one example, in a synchronous network game application, it is necessary to keep information on where a character or the like is on the map synchronized with the application. In this case, the terminal devices 100 simultaneously playing the network game belong to different eNodeBs 200, but requisite data is necessary to be cached in the eNodeB 200 corresponding to each of these terminal devices 100. Further, it is necessary to synchronize the state of the game applications arranged in the eNodeBs 200 corresponding to these terminal devices 100. Thus, at the eNodeB 200, the activation of the application, internal state of the application, and caching for the application are necessary to be performed by causing it to be linked between the separated eNodeBs 200.

Figure 4:
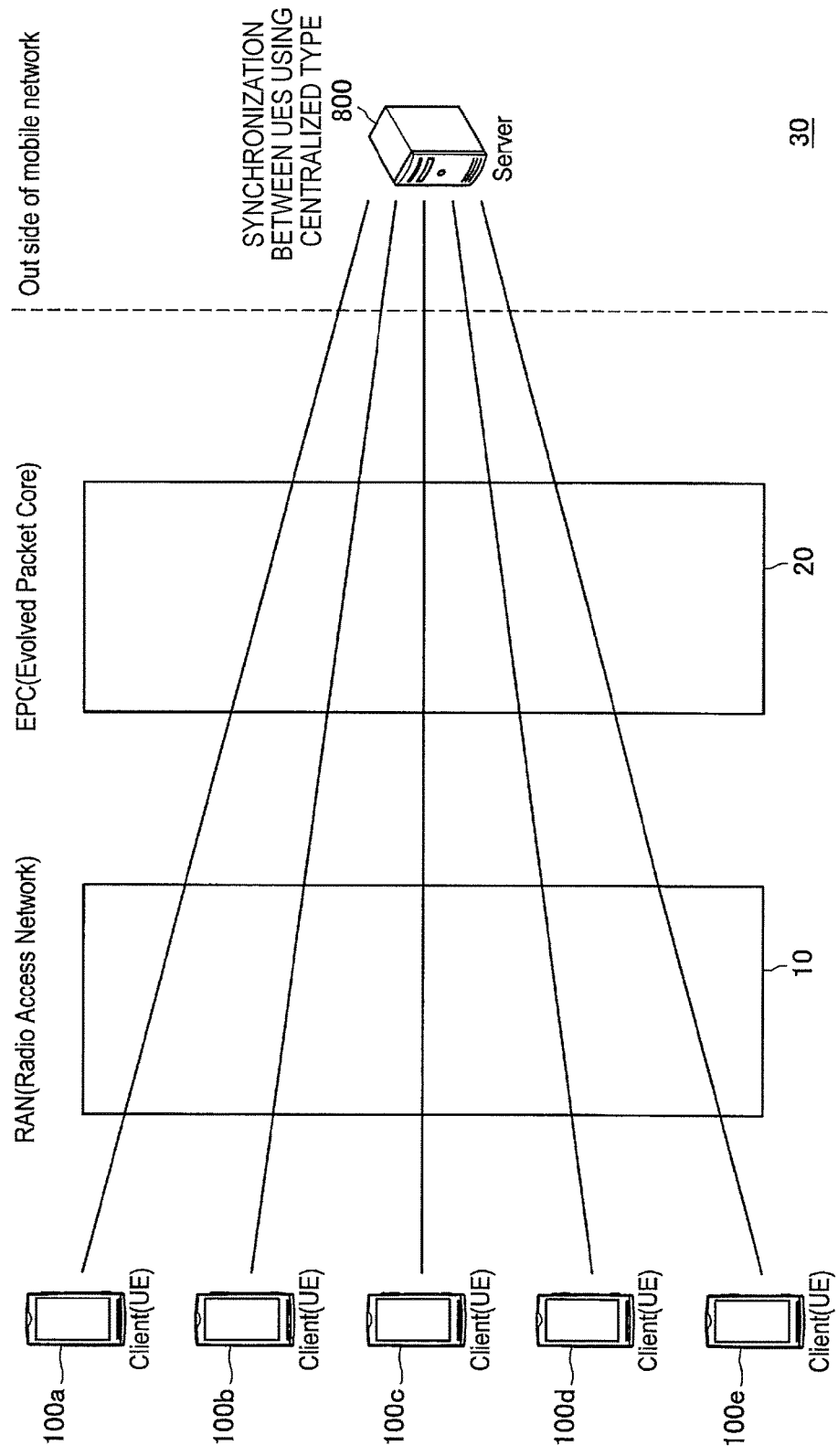
FIG. 4 is a diagram illustrated to describe an example of information synchronization using a centralized server.

In general, a method of synchronizing information of a network game is roughly divided into server-centralized type and peer-to-peer (P2P) type. FIG. 4 is a diagram illustrated to describe an example of information synchronization using the server-centralized type. In addition, FIG. 5 is a diagram illustrated to describe an example of information synchronization using the P2P type.

The server-centralized type is a method in which logically one server device 800 in the center achieves synchronization among the terminal devices 100a to 100e of all users. In the server-centralized type, the response of the user far from the server device 800 is delayed, and the load on the server device 800 is also increased.

The P2P type is a method in which synchronization signals are directly exchanged between users (between terminal devices serving as clients). The P2P type is suitable for the case of one-to-one or a case where the number of users is small, but it is not suitable for the battle game where thousands or tens of thousands participate.

Figure 5:
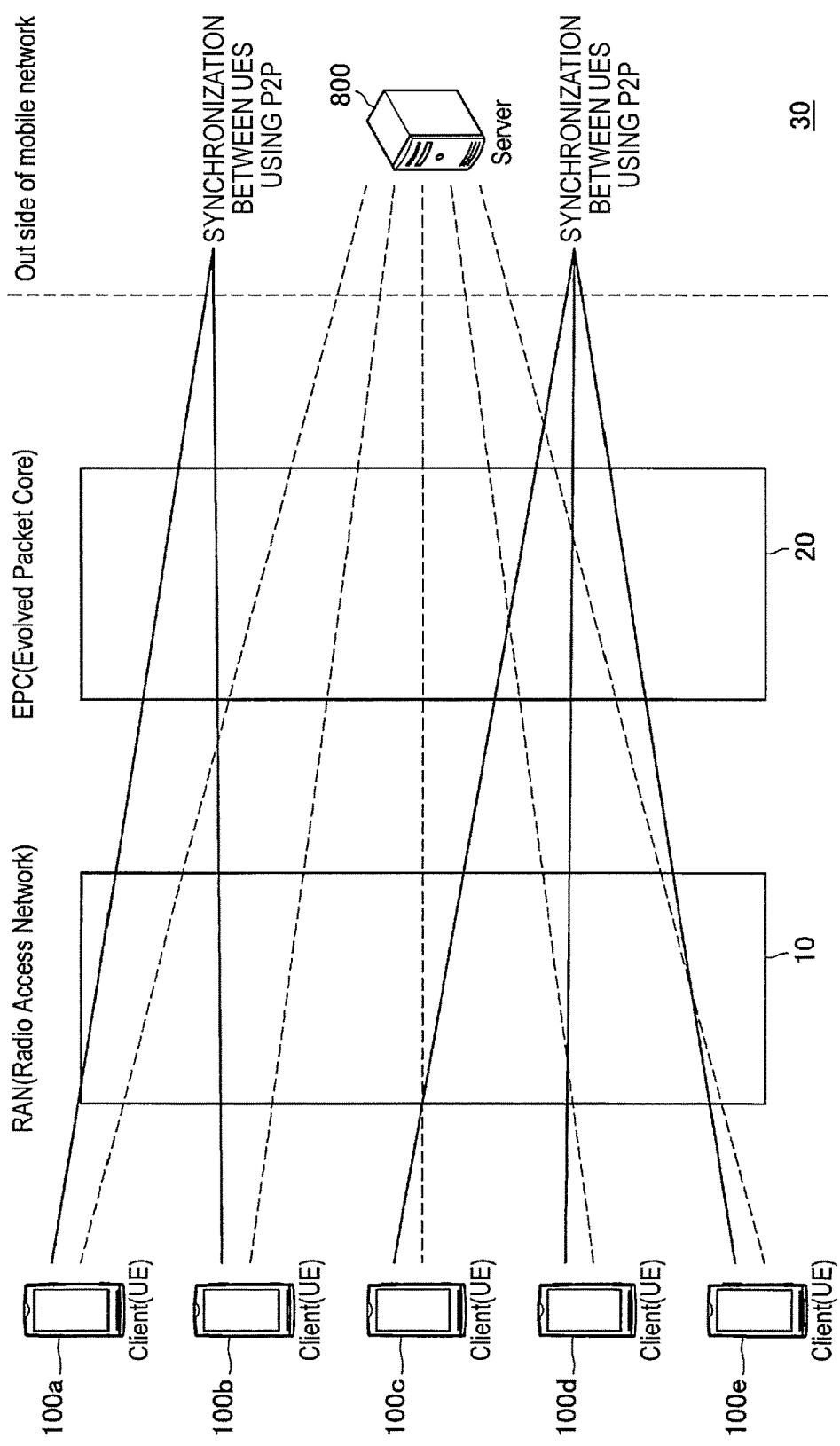
FIG. 5 is a diagram illustrated to describe an example of information synchronization using P2P.

In the case where the application can be arranged in the eNodeB 200, it is possible to obtain advantages of the centralized type illustrated in FIG. 4 and the P2P type illustrated in FIG. 5 by synchronizing the applications arranged in the eNodeB 200.

Figure 6:
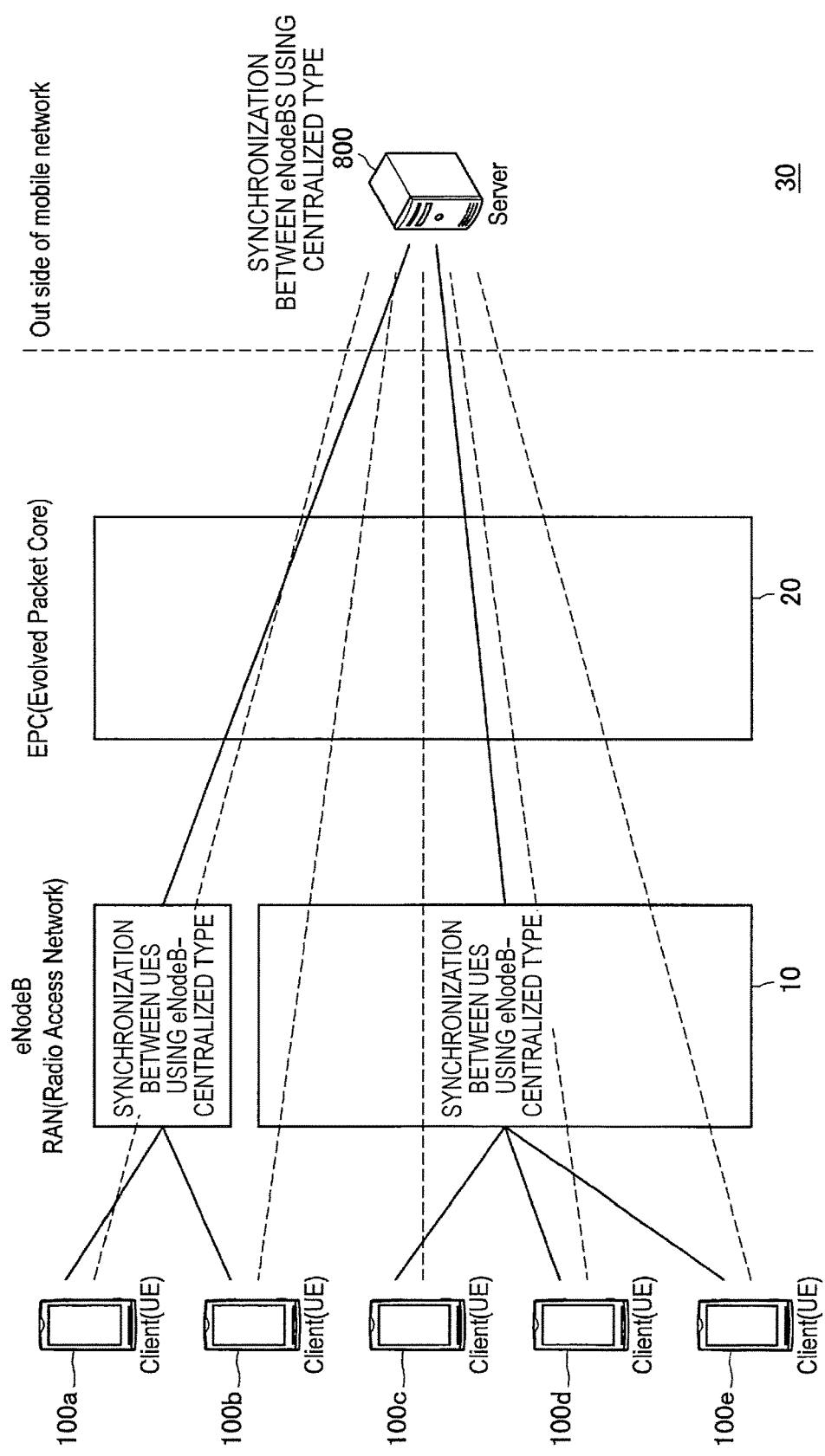
FIG. 6 is a diagram illustrated to describe an example of information synchronization to which the MEC is applied.
Figure 7:
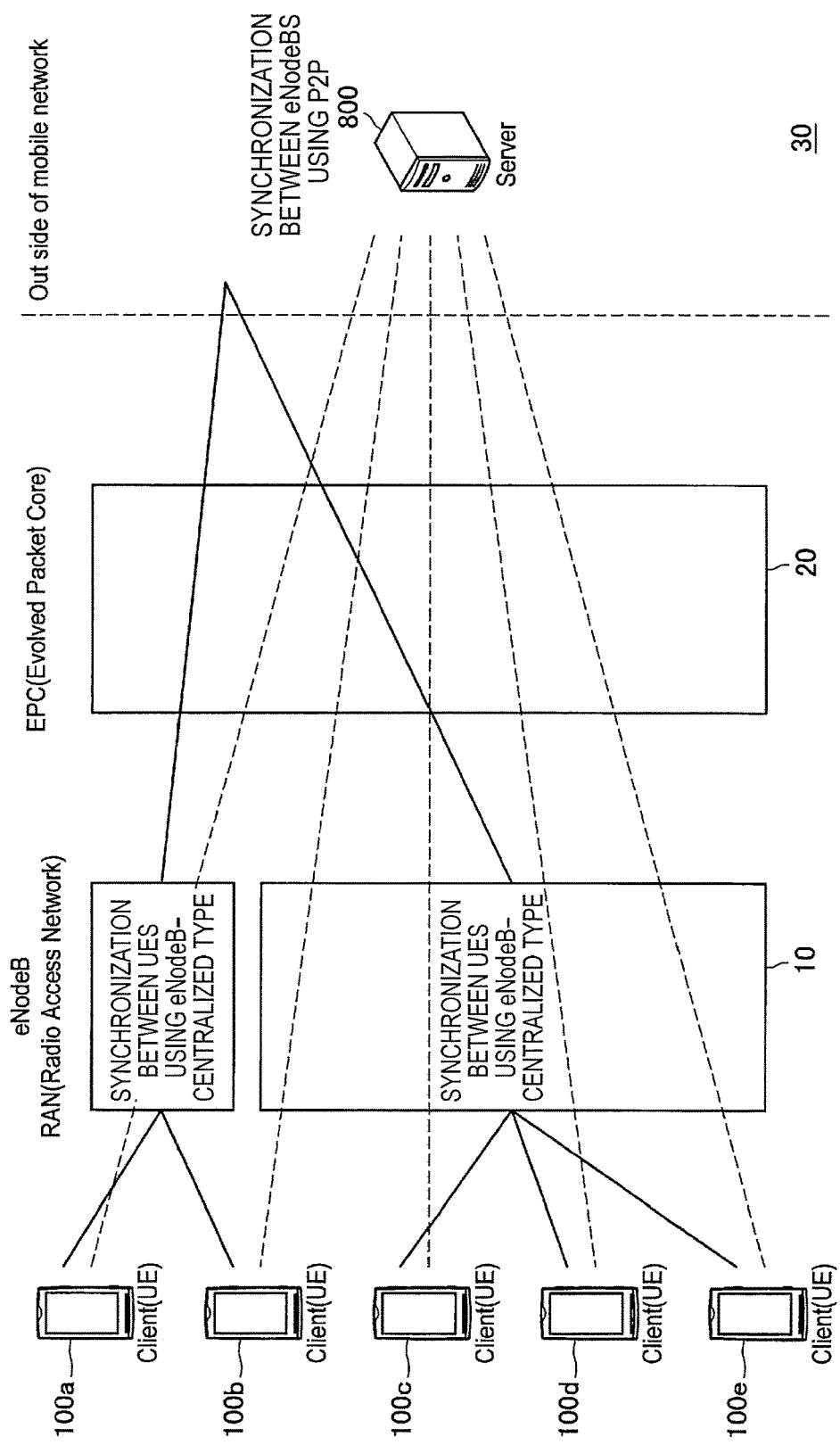
FIG. 7 is a diagram illustrated to describe an example of information synchronization to which the MEC is applied.
Figure 8:
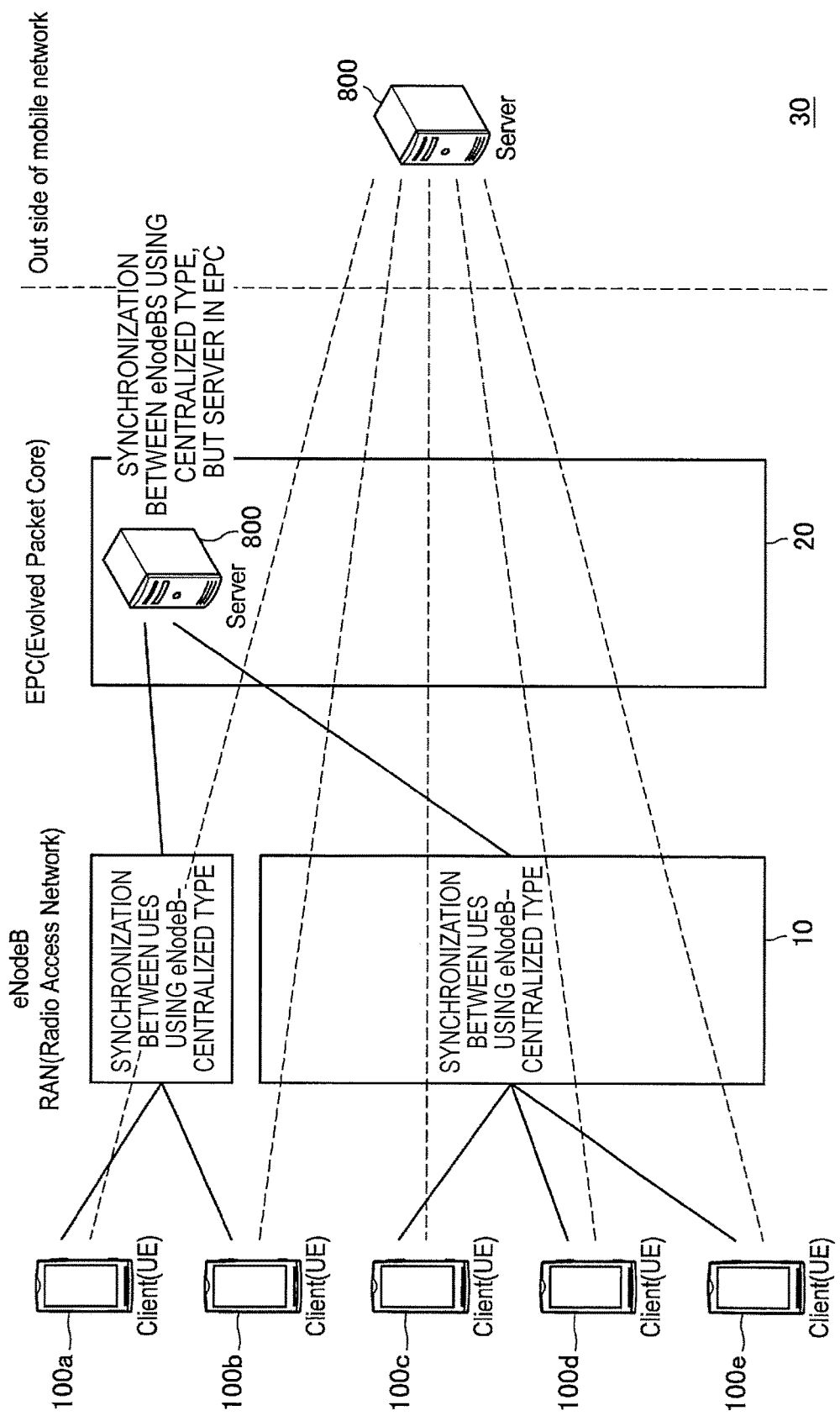
FIG. 8 is a diagram illustrated to describe an example of information synchronization to which the MEC is applied.
Figure 9:
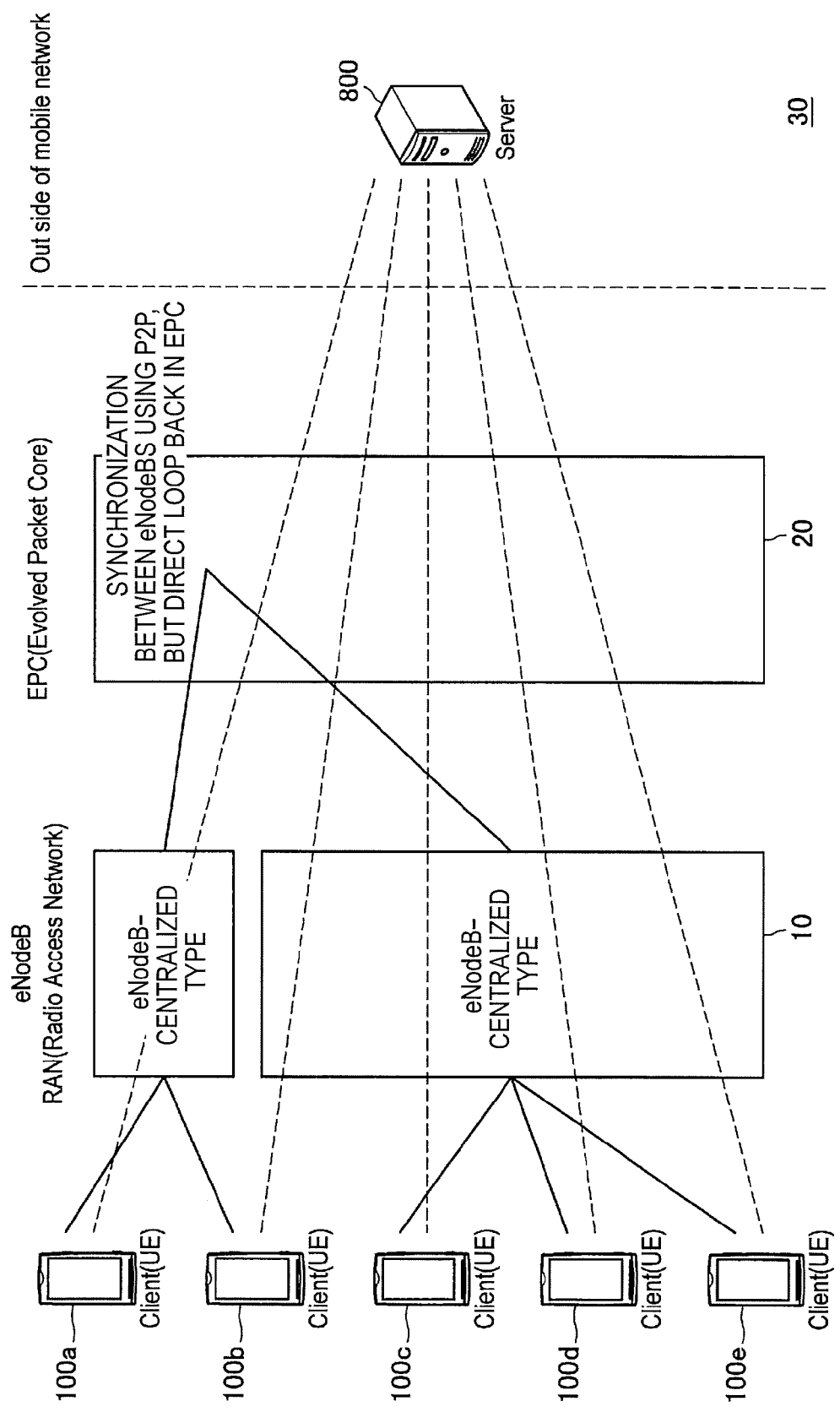
FIG. 9 is a diagram illustrated to describe an example of information synchronization to which the MEC is applied.

FIGS. 6 to 9 are diagrams illustrated to describe an example of information synchronization to which the MEC is applied. FIG. 6 illustrates an example in which the eNodeB 200 centrally synchronizes information between the terminal devices 100 and the server device 800 centrally synchronizes information between the eNodeBs 200. FIG. 7 illustrates an example in which the eNodeB 200 centrally synchronizes information between the terminal devices 100 and the server device 800 synchronizes information between the eNodeBs 200 using the P2P type. FIG. 8 illustrates an example in which the eNodeB 200 centrally synchronizes information between the terminal devices 100 and the server device 800 placed in the EPC 20 centrally synchronizes information between the eNodeBs 200. FIG. 9 illustrates an example the eNodeB 200 centrally synchronizes information between the terminal devices 100, and information is synchronized between the eNodeBs 200 using the P2P type which directly loops back in the EPC 20.

In this way, in one example, an application is arranged in the eNodeB 200 where the terminal device 100 participating in a network game is located and the applications arranged in the eNodeB 200 are synchronized with each other in the server-centralized or P2P type. This allows the load on the server device 800 to be reduced, as compared with the case of direct synchronization between a large number of terminal devices 100.

Figure 10:
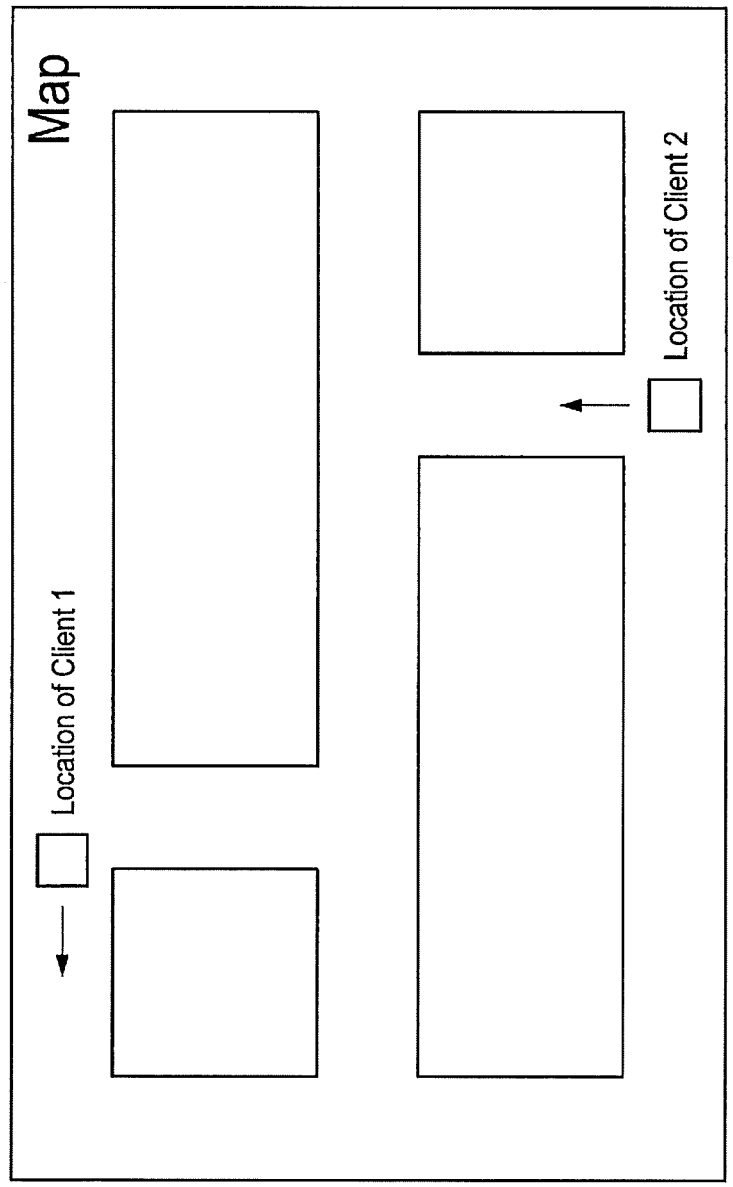
FIG. 10 is a diagram illustrated to describe an example of a screen displayed by an application.

FIG. 10 is a diagram illustrated to describe an example of a screen displayed by an application, which is an example of a screen displaying the positions of characters, which are operated by different users on a map, simultaneously on the map. In the case where it is necessary to synchronize the positions of the characters on the map between the terminal devices 100 as illustrated in FIG. 10, the position on the map of the game of the character operated on the terminal device 100 belonging to one eNodeB 200 may be mapped on the map in the application of the eNodeB 200, and the position information of the integrated character on the map may be arranged in synchronization with each other on the map of another eNodeB 200. In other words, it is unnecessary for even the terminal device 100 to perform updating directly on the map, so the load on the network is reduced.

In the eNodeB 200, the information related to the user on the map in the application of each eNodeB 200 is updated. Thus, when the terminal device 100 accesses the map information of the eNodeB 200 as necessary, it is possible to update the screen of the game with a response time shorter than the case of accessing the server device 800.

In this way, the arrangement of the cache data or application in the eNodeB 200 makes it possible to improve the response from the terminal device 100. However, in arranging the cache data or application in the eNodeB 200, it is necessary to consider the following points.

(1) Delay Due to Cache Data

As described above, it is effective to arrange the function of the cache server 700 in the eNodeB 200 close to the user to deliver data corresponding to the request of the terminal device 100 to the user in a short time.

However, the data, which has been not actually used by another terminal device 100 belonging to the eNodeB 20 even once, is typically not cached. The data, which has never been used by all the terminal devices 100 belonging to the eNodeB 200, is not cached in the eNodeB 200. Thus, the terminal device 100 that accessed the data for the first time is necessary to acquire data from a server (e.g., the S-GW 500 or the server 800 arranged in a normal network outside the mobile network) that is further away from the eNodeB 200 in the mobile network.

Thus, if data is not cached in the eNodeB 200, the response time which is the time taken to deliver the data to the terminal device 100 in a response on the basis of the request of the terminal device 100 will be increased.

Thus, in the case where the terminal device 100, which belongs to the eNodeB 200 but belonged to it in the past, attempts to acquire data, which has never been used by the terminal device 100, for the first time, there is no cache data in the eNodeB 200. Thus, the terminal device 100 will takes time to acquire data.

(2) Delay Due to Application Starting

The same applies to the case where an application of the eNodeB 200 is arranged. As described above, it is effective to arrange the server where the application is arranged in the eNodeB 200 close to the user to deliver data corresponding to the request of the terminal device 100 to the user in a short time.

However, simply arranging the application in the eNodeB 200 is insufficient, and so it is necessary to activate the application arranged in the eNodeB 200 to which the terminal device 100 concerned with the application belongs by causing it to be linked between the eNodeBs 200 and is necessary to be ready for use it.

In the case where there are the eNodeB 200 that activates an application and the eNodeB 200 that does not activate the application, it is conceivable that the response of the terminal device 100 belonging to the eNodeB 200 that does not activate the application is delayed. Furthermore, the terminal device 100 is often in motion, so it is conceivable that the response of the terminal device 100 is delayed unless the application is activated in the eNodeB 200 serving as a destination by handover.

(3) Delay Due to Non-Synchronized Internal State of Application

There is a case in which the internal state of an application arranged in the respective eNodeBs 200 is desired to be synchronized between the respective eNodeBs 200. Even if an application is arranged and is in an active state, non-synchronization of the internal state may cause inconsistency between the terminal devices 100 using the application arranged in the respective eNodeBs 200. In one example, there are problems in the following three use cases.

(Use Case 1)

A use case where the terminal device 100 belonging to an eNodeB 200 and a neighboring terminal device 100 belonging to an eNodeB 200 adjacent thereto are desired to use the same application is assumed. In one example, there may be a case where a plurality of small base stations are installed at an event site. In this case, when a particular terminal device 100 uses an application corresponding to the event, if the same application is not allowed to be used in the same manner by the plurality of small base stations, the response of the application is delayed.

(Use Case 2)

A use case where a small cell (small base station) is arranged is assumed. The small cell has a function of switching between a normal on state and an off state with reduced power consumption. In the off state, there is a feature such that a predetermined reference signal (reference signal) is not transmitted. Even if the terminal device 100 does not move from the place, the small cell to be connected to the terminal device may change frequently sometimes. In such a case, the application is necessary to be active in all the small cells.

In the case where a plurality of small cells are physically implemented in one device and only an antenna is implemented separately as a small cell, the one device includes an application or data practically, so there seems to be no problem with synchronization. However, if the application is not in an active state in each small cell implemented logically, it is considered that a delay occurs depending on the small cell accessed by the terminal device 100.

(Use Case 3)

In a network game, there is a case where thousands or tens of thousands of users play the game while influencing each other in real time in one game world. In this case, it is necessary to synchronize the internal states of the application of a plurality of users. However, if the internal states of the application are not synchronized between the eNodeBs 200, inconvenience due to a delay for synchronizing the data or non-synchronization of data will occur.

In view of this, the person who conceived the present disclosure has conducted intensive studies to provide a technology capable of further reducing the response time of the terminal device in the mobile network system to which the MEC is applied. Accordingly, the person who conceived the present disclosure has developed the technology capable of further reducing the response time of the terminal device in the mobile network system to which the MEC is applied by determining a base station in which data is held in advance and by causing the determined base station to hold the data.

The configuration example of the system according to an embodiment of the present disclosure is described above. Subsequently, a configuration example of a device according to an embodiment of the present disclosure is described in detail.

1.2. Device Configuration Example

1.2.1. Configuration Example of Terminal Device

Figure 11:
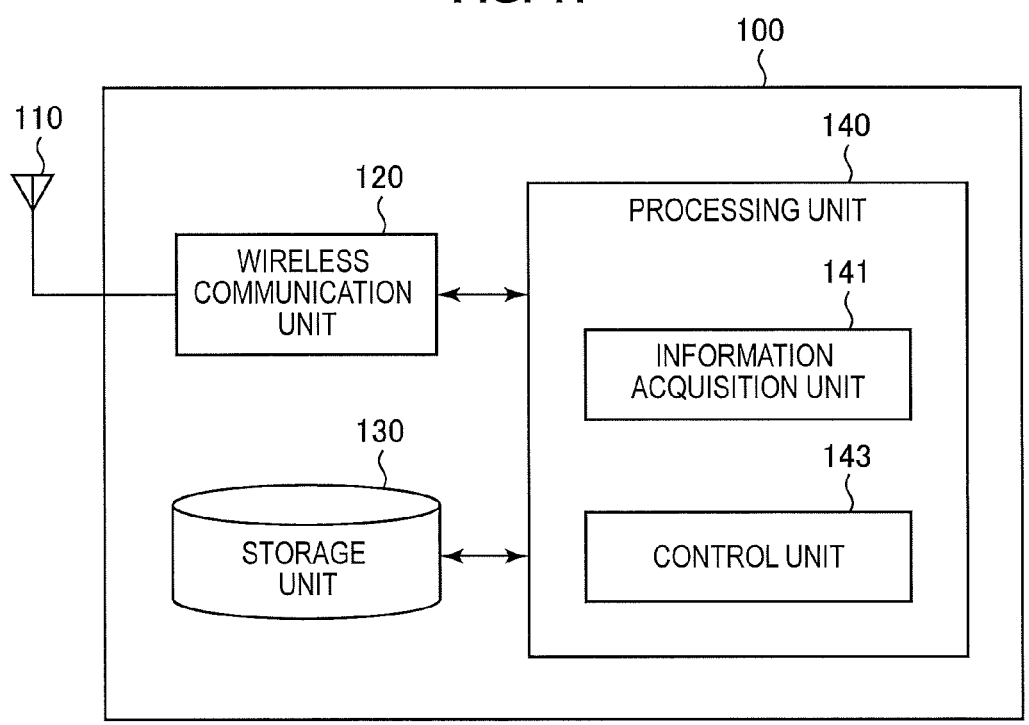
FIG. 11 is a block diagram illustrating a configuration example of a terminal device 100 according to an embodiment of the present disclosure.

First, a configuration example of a terminal device 100 according to an embodiment of the present disclosure is described. FIG. 11 is a block diagram illustrating an exemplary configuration of the terminal device 100 according to an embodiment of the present disclosure. Referring to FIG. 11, the terminal device 100 is configured to include an antenna unit 110, a wireless communication unit 120, a storage unit 130, and a processing unit 140.

(Antenna Unit 110)

The antenna unit 110 emits a signal output by the wireless communication unit 120 to a space as a radio wave. In addition, the antenna unit 110 converts a radio wave in a space into a signal and outputs the signal to the wireless communication unit 120.

(Wireless Communication Unit 120)

The wireless communication unit 120 transmits and receives a signal. In one example, the wireless communication unit 120 receives a downlink signal from the eNodeB 200 and transmits an uplink signal to the eNodeB 200.

(Storage Unit 130)

The storage unit 130 temporarily or permanently stores a program and data that allow the terminal device 100 to operate. In the present embodiment, the storage unit 130 stores, in one example, a program for an application running on the terminal device 100. The program or data stored in the storage unit 130 is read out, whenever necessary, by a control unit 143.

(Processing Unit 140)

The processing unit 140 allows the terminal device 100 to perform various functions. The processing unit 140 includes an information acquisition unit 141 and the control unit 143. Moreover, the processing unit 140 can further include other components in addition to these components. That is, the processing unit 140 can also perform other operations in addition to the operations of these components.

(Information Acquisition Unit 141)

The information acquisition unit 141 acquires various types of information from a signal obtained from the radio wave received by the antenna unit 110. In the present embodiment, the information acquisition unit 141 acquires a response to the request to the eNodeB 200. In one example, when the control unit 143 transmits, to the eNodeB 200, a content acquisition request serving as a request signal to the eNodeB 200, the information acquisition unit 141 acquires content serving as a response from the eNodeB 200.

(Control Unit 143)

The control unit 143 controls the operation of the terminal device 100. In the present embodiment, the terminal device 100 performs processing of causing the antenna unit 110 to transmit information on an application in which data is linked with another terminal device 100 that communicates with the same eNodeB 200 or a different eNodeB 200 as or from the eNodeB 200 that communicates with the terminal device 100. The information sent from the terminal device 100 is transmitted to the MME 300 via the eNodeB 200. It is possible for the MME 300 to determine the eNodeB 200 that causes the application to be activated using the information sent from the terminal device 100.

The example of the functional configuration of the terminal device 100 according to an embodiment of the present disclosure is described above. Next, an example of a functional configuration of the eNodeB 200 according to an embodiment of the present disclosure is described.

1.2.3. Configuration Example of Base Station

Figure 12:
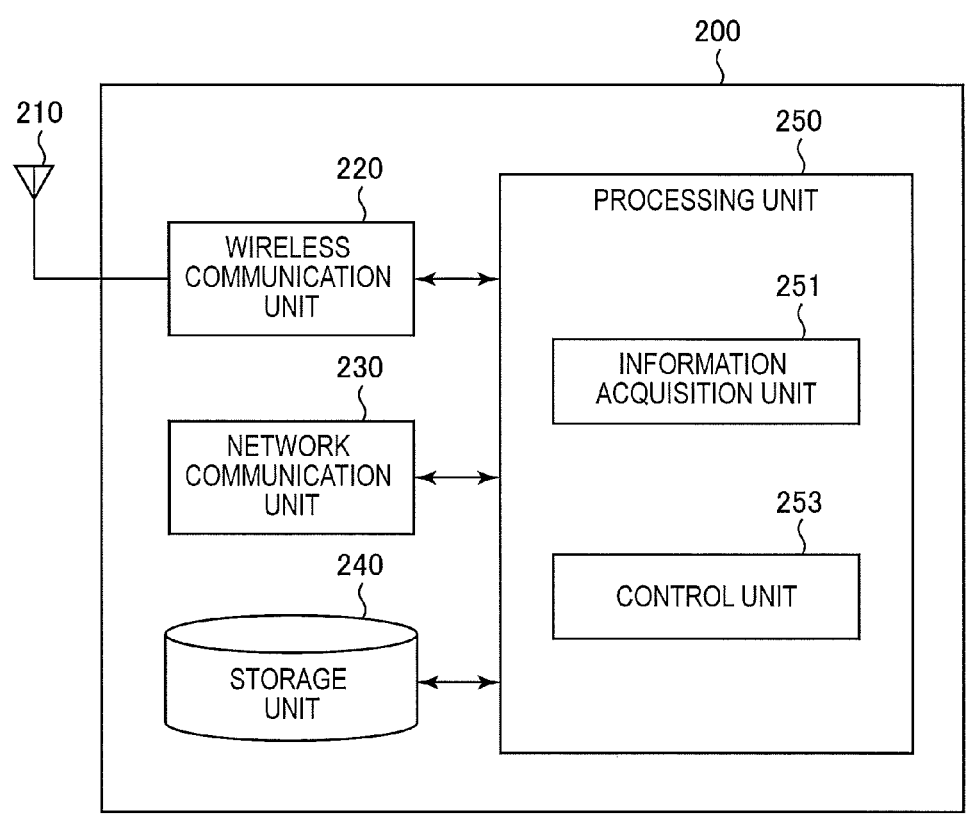
FIG. 12 is a block diagram illustrating a functional configuration example of an eNodeB 200 according to an embodiment of the present disclosure.

FIG. 12 is a block diagram illustrating an example of a functional configuration of the eNodeB 200 according to an embodiment of the present disclosure. As illustrated in FIG. 12, the eNodeB 200 according to an embodiment of the present disclosure is configured to include an antenna unit 210, a wireless communication unit 220, a network communication unit 230, a storage unit 240, and a processing unit 250.

(Antenna Unit 210)

The antenna unit 210 emits a signal output by the wireless communication unit 220 to a space as a radio wave. In addition, the antenna unit 210 converts a radio wave of a space into a signal and outputs the signal to the wireless communication unit 220.

(Wireless Communication Unit 220)

The wireless communication unit 220 transmits and receives a signal. In one example, the wireless communication unit 220 transmits a downlink signal to terminal device and receives an uplink signal from terminal device.

(Network Communication Unit 230)

The network communication unit 230 transmits and receives information. In one example, the network communication unit 230 transmits information to other nodes and receives information from other nodes. An example of the other node includes a core network and other base stations. In one example, the other node includes the MME 300.

(Storage Unit 240)

The storage unit 240 temporarily or permanently stores a program and data that allow the eNodeB 200 to operate. In the present embodiment, the storage unit 240 stores cache data referred to by the eNodeB 200, or stores an application and data used by the application. The program or data stored in the storage unit 240 is read out, whenever necessary, by the control unit 253.

(Processing Unit 250)

The processing unit 250 allows the eNodeB 200 to perform various functions. The processing unit 250 includes an information acquisition unit 251 and the control unit 253. Moreover, the processing unit 250 can further include other components in addition to these components. That is, the processing unit 250 can also perform other operations in addition to the operations of the components.

(Information Acquisition Unit 251)

The information acquisition unit 251 acquires information or a program that allows the eNodeB 200 to operate, or acquires information received from other nodes. The information acquisition unit 251 can acquire information or a program that allows the eNodeB 200 to operate from the storage unit 240. In addition, the information acquisition unit 251 acquires cache data, a command for activating the application, and data used by the application, which are transmitted from another eNodeB 200 that is in linked state.

(Control Unit 253)

The control unit 253 controls the operation of the eNodeB 200. In the present embodiment, the control unit 253 performs processing of returning data in response to a request from the terminal device 100 or processing of linking data with another eNodeB 200 on the basis of a notification from the MME 300.

In one example, when there is a notification from the MME 300 that data is linked with another eNodeB 200, the control unit 253 executes control so that the cache data referred to by the terminal device 100 or a command for activating an application and data used by the application is forwarded to the other eNodeB 200 on the basis of the notification.

The eNodeB 200 performs forwarding of an applications or cache data to other eNodeBs 200 via the X2 interface. In addition, the eNodeB 200 also transmits a command for activation of the application via the X2 interface. Moreover, in the case where the MME 300 instructs to cooperate with an eNodeB 200 that is separated to some extent, the eNodeB 200 forwards an application or cache data or sends a command for activation of an application via the S-GW 500.

In some cases, an eNodeB 200 causes the cache data or the like to be linked with another eNodeB 200 via the X2 interface, and in other cases, it causes the cache data or the like to be linked with another eNodeB 200 via the EPC 20. In the case where the cache data or the like is intended to be linked via the EPC 20, when the cache data or the like is linked with the other eNodeB 200, the control unit 253 may cause the server device 800 to centrally link the cache data or the like, cause the eNodeBs 200 to link it with each other using P2P, cause the server device 800 placed in the EPC 20 to centrally link it between the eNodeBs 200, and cause the eNodeBs 200 to directly loop back with each other using P2P, as described with reference to FIGS. 6 to 9, respectively.

The example of the functional configuration of the eNodeB 200 according to an embodiment of the present disclosure is described above. Next, an example of a functional configuration of the MME 300 according to an embodiment of the present disclosure is described.

1.2.3. Configuration Example of Control Entity

Figure 13:
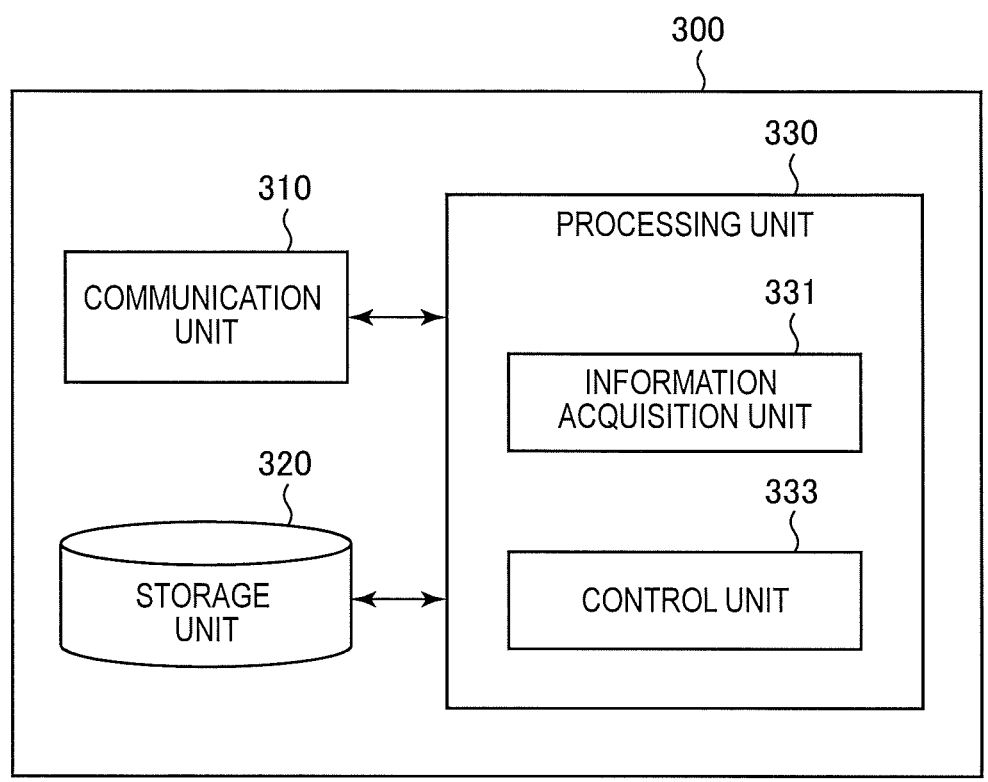
FIG. 13 is a block diagram illustrating a functional configuration example of an MME 300 according to an embodiment of the present disclosure.

FIG. 13 is a block diagram illustrating an example of a functional configuration of the MME 300 according to an embodiment of the present disclosure. As illustrated in FIG. 13, the MME 300 according to an embodiment of the present disclosure is configured to include a communication unit 310, a storage unit 320, and a processing unit 330.

(Communication Unit 310)

The communication unit 310 transmits and receives information. In one example, the communication unit 310 transmits information to other nodes and receives information from other nodes. An example of the other node includes a core network and a base station. In one example, the other node includes the eNodeB 200.

In the present embodiment, the communication unit 310 notifies the NodeB 200 determined by a control unit 333 that the cache data is held by linkage or the application is activated under the control of the control unit 333. The communication unit 310 can also function as an example of a notification unit of the present disclosure.

(Storage Unit 320)

The storage unit 320 temporarily or permanently stores a program and data that allow the MME 300 to operate. In one example, the storage unit 320 temporarily or permanently stores the information acquired by an information acquisition unit 331.

The storage unit 320 may store data that is used by the control unit 333 for various types of control. In one example, in a case where the control unit 333 determines the eNodeB 200 to be linked on the basis of geographical conditions, the storage unit 320 may store geographical information of the eNodeB 200. In one example, in a case where the control unit 333 determines the eNodeB 200 to be linked on the basis of the attribute of the terminal device 100, the storage unit 320 may store information on the attribute of the terminal device 100. The information on the attribute of the terminal device 100 is typically stored in the HSS 400, and the storage unit 320 may store information on the attribute of the terminal device 100 that is acquired from the HSS 400 by the information acquisition unit 331.

(Processing Unit 330)

The processing unit 330 allows the MME 300 to perform various functions. The processing unit 330 includes the information acquisition unit 331 and the control unit 333. Moreover, the processing unit 330 can further include other components in addition to these components. That is, the processing unit 330 can also perform other operations in addition to the operations of the components.

(Information Acquisition Unit 331)

The information acquisition unit 331 acquires information that allows the MME 300 to operate and acquires information received from other nodes. The information acquisition unit 331 can acquire information or a program that allows the MME 300 to operate from the storage unit 320.

(Control Unit 333)

The control unit 333 controls the operation of the MME 300. The control unit 333 can operate on the basis of the information acquired by the information acquisition unit 331. In the present embodiment, the control unit 333 determines the eNodeB 200 that is caused to hold cache data or activate an application on the basis of predetermined conditions. The control unit 333 may determine the eNodeB 200 that is caused to hold cache data or activate an application on the basis of the information acquired by the information acquisition unit 331. In the following description, the eNodeB 200 that is caused to hold cache data or activate an application is also referred to as an eNodeB 200 to be linked.

There are various predetermined conditions used when the control unit 333 determines the eNodeB 200. In one example, the control unit 333 may determine the eNodeB 200 to be linked on the basis of geographical conditions. Examples of the geographical conditions include positioning within a predetermined range or the like. In addition, in one example, the control unit 333 may determine the eNodeB 200 to be linked on the basis of content of a request from the terminal device 100, the attribute of the terminal device 100, or the like. In one example, the control unit 333 may determine the eNodeB 200 specified by the terminal device 100 as the eNodeB 200 to be linked, or may determine the eNodeB 200 to which another eNodeB 200 linked with the terminal device 100 belongs as the eNodeB 200 to be linked.

The example of the functional configuration of the MME 300 according to an embodiment of the present disclosure is described above. Next, an example of an operation of the mobile network according to an embodiment of the present disclosure is described.

1.3. Operation Example

1.3.1. First Operation Example

First, as a first operation example, an example is described in which the MME 300 or other management node (e.g., the HSS 400) previously determines the eNodeB to be linked on the basis of geographical conditions.

Figure 14:
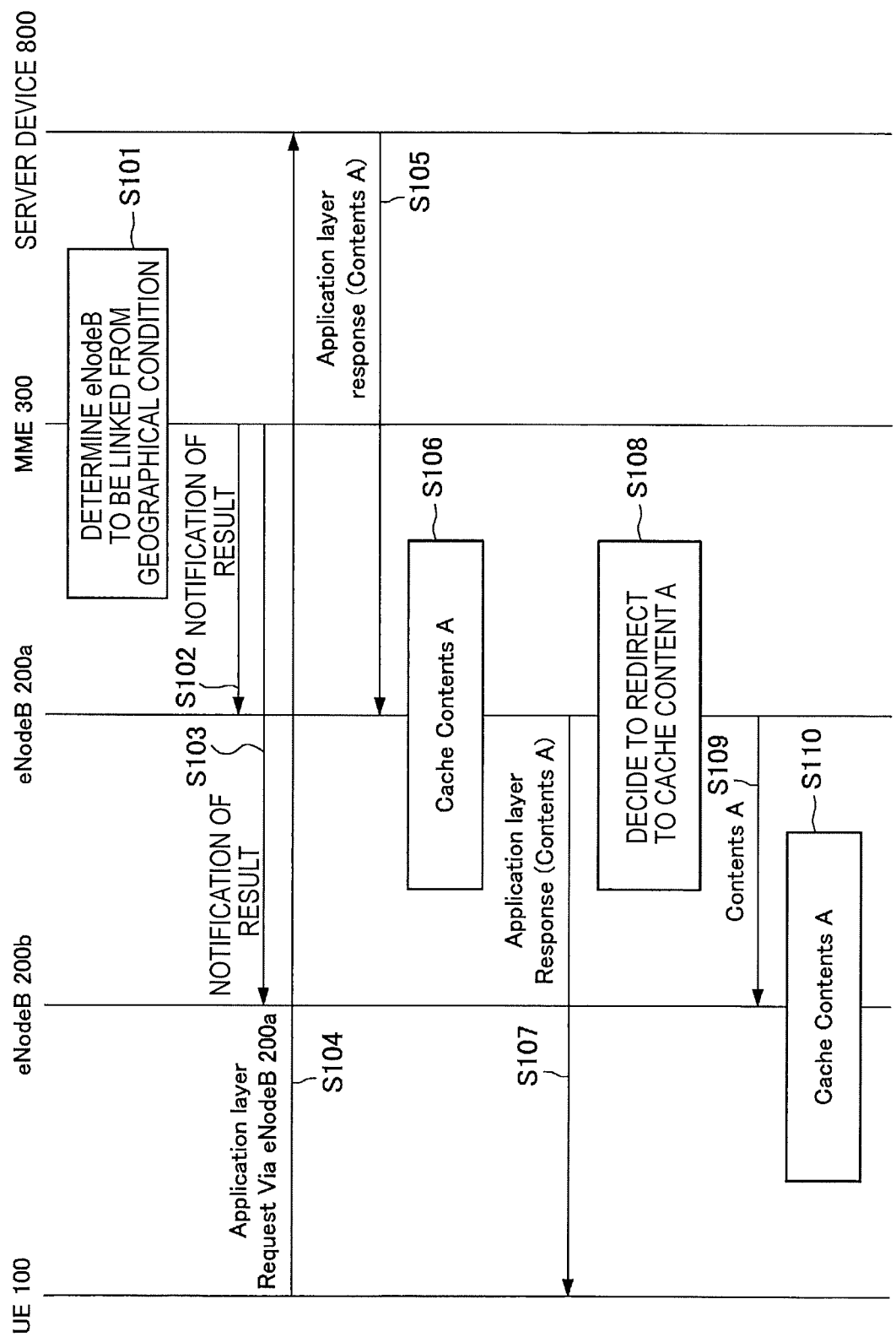
FIG. 14 is a flow diagram illustrating an operation example of a mobile network according to an embodiment of the present disclosure.

FIG. 14 is a flow diagram illustrating an operation example of the mobile network according to an embodiment of the present disclosure. FIG. 14 illustrates an operation example in the case where the MME 300 or other management node (e.g., the HSS 400) previously determines the eNodeB to be linked on the basis of geographical conditions.

The MME 300 determines an eNodeB to be linked, in one example, on the basis of geographical conditions (step S101). The processing in step S101 is executed by, in one example, the control unit 333. The MME 300 may determine an eNodeB to be linked, in one example, on the condition that it exists in a predetermined area as a geographical condition, or may determine an eNodeB to be linked on condition that it is located within a circle of a predetermined radius around a certain point. In addition, the MME 300 may determine an eNodeB to be linked on the condition that the terminal device 100 is located within a range where it is likely to move. In one example, the MME 300 may decide a range within which the terminal device 100 is likely to move, in one example, on the basis of the history of position information of the terminal device 100, the history of connection to the eNodeB 200 in the past, or the like. Alternatively, the MME 300 may decide the range on the basis of contract information of the terminal device 100. FIG. 14 illustrates an example in which the MME 300 determines the eNodeBs 200a and 200b as the eNodeBs to be linked.

The MME 300 can also determine an eNodeBs to be linked using various other conditions. In one example, in a case where a target eNodeB is a small cell whose power source is frequently switched on/off, the MME 300 may determine a small cell located within the predetermined range as an eNodeB to be linked.

The MME 300, when determining an eNodeB 200 to be linked on the basis of the geographical condition, notifies the determined eNodeB 200 that it is determined as the eNodeB 200 to be linked (steps S102 and S103). The processing in steps S102 and S103 is executed by, in one example, the control unit 333 that causes the communication unit 310 to transmit the notification. In FIG. 14, the eNodeBs 200a and 200b are determined as eNodeBs to be linked, and so the MME 300 notifies the eNodeBs 200a and 200b of the result.

Then, when the terminal device 100 transmits a request for predetermined content (referred to as content A) in the application layer to the eNodeB 200a (step S104), the request is transferred from the eNodeB 200a to the server device 800 via the S-GW 500 and the P-GW 600. The server device 800 returns a response for the content A in the application layer to the eNodeB 200a (step S105). The eNodeB 200a is notified that it is determined as the eNodeB to be linked from the MME 300, and caches the content A (step S106).

The eNodeB 200a, when caching the content A returned from the server device 800, returns a response for the content A in the application layer to the terminal device 100 (step S107). Furthermore, the eNodeB 200a is notified that it is linked with the eNodeB 200b from the MME 300, and so decides to redirect the content A so that the content A is caused to be cached in the eNodeB 200b (step S108)

Then, the eNodeB 200a transfers the content A via the X2 interface to cause the eNodeB 200b to cache the content A (step S109). The eNodeB 200 is notified that it is determined as the eNodeB to be linked from the MME 300, and so caches the content A transferred from eNodeB 200a (step S110).

The eNodeBs 200a and 200b and the MME 300 execute the series of operations illustrated in FIG. 14, so it is possible for the eNodeBs 200a and 200b to cache the content held by the server device 800 by causing it to be linked between the eNodeBs 200a and 200b. Thus, when the terminal device 100 accesses the eNodeB 200b and requests the content A by a request in the application layer, it is possible for the terminal device 100 to acquire the content A cached in the eNodeB 200b. Thus, the eNodeBs 200a and 200b and the MME 300 execute the series of operations illustrated in FIG. 14, so it is possible to reduce the response time of the terminal device 100.

In FIG. 14, there is illustrated an example where the terminal device 100 first accesses the eNodeB 200a and so causes the eNodeBs 200a and 200b to hold the cache data by causing it to be linked with each other. However, if the terminal device 100 first accesses the eNodeB 200b, it is natural that the eNodeB 200b acquires and caches data from the server device 800, and transfers the cache data to the eNodeB 200a via the X2 interface. The operation of the eNodeBs 200a and 200b as described above makes it possible to cause the eNodeBs 200a and 200b to hold the cache data by causing it to be linked with each other.

In some cases, an eNodeB 200 may cause the cache data or the like to be linked with another eNodeB 200 via the X2 interface, or in other cases, an eNodeB 200 may cause the cache data or the like to be linked with another eNodeB 200 via the EPC 20. In the case where the cache data or the like is intended to be linked via the EPC 20, when the eNodeB 200a causes the cache data or the like to be linked with the other eNodeB 200, the eNodeB 200a may cause the server device 800 to centrally link the cache data or the like, cause the eNodeBs 200 to link it with each other using P2P, cause the server device 800 placed in the EPC 20 to centrally link it between the eNodeBs 200, and cause the eNodeBs 200 to directly loop back with each other using P2P, as described with reference to FIGS. 6 to 9, respectively.

1.3.2. Second Operation Example

Subsequently, as a second operation example, an example is described in which the MME 300 or other management node (e.g., the HSS 400) determines an eNodeB to be linked on the basis of the attribute of the terminal device 100 that sends a request.

Figure 15:
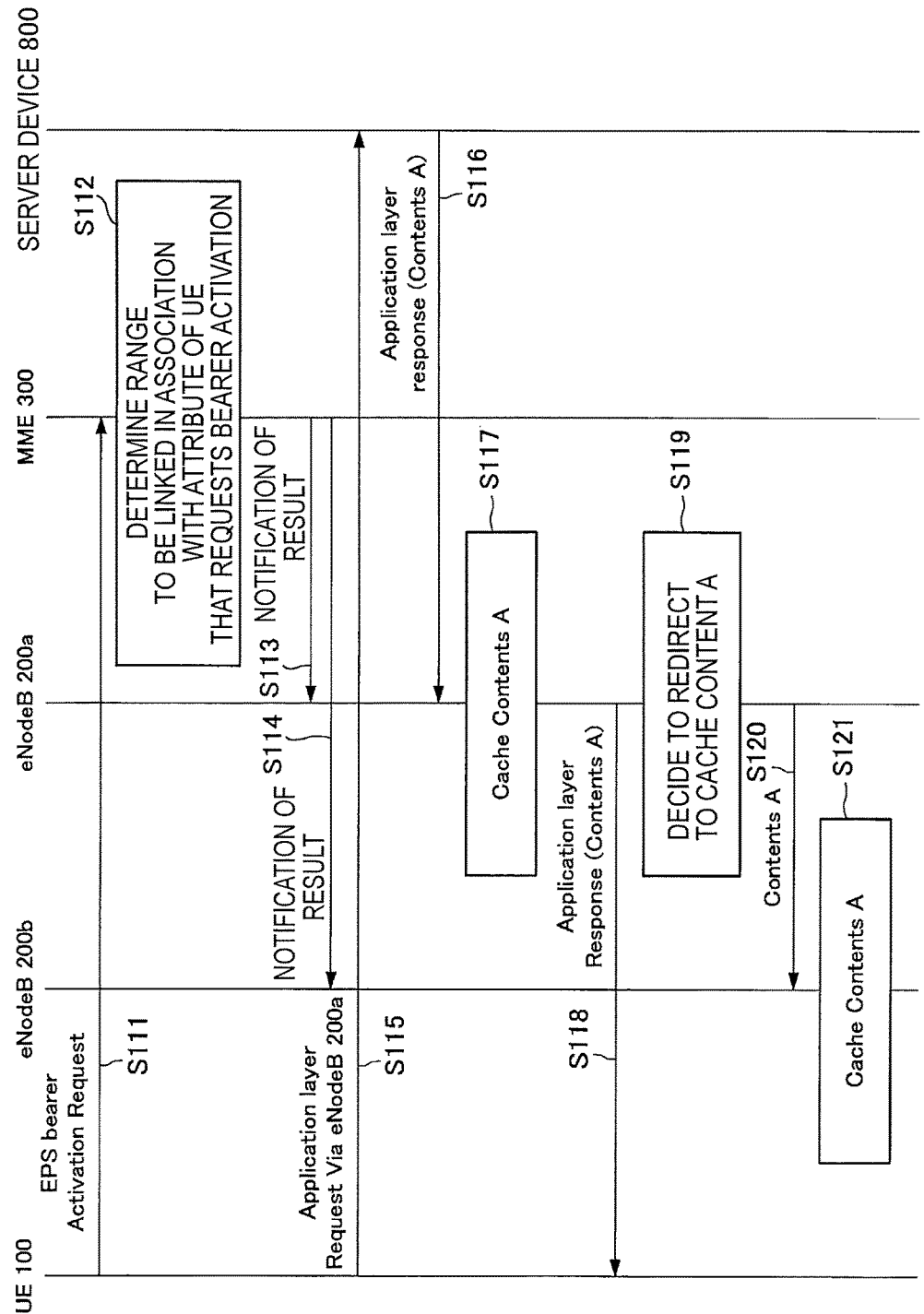
FIG. 15 is a flow diagram illustrating an operation example of a mobile network according to an embodiment of the present disclosure.

FIG. 15 is a flow diagram illustrating an operation example of the mobile network according to an embodiment of the present disclosure. FIG. 15 illustrates an operation example in the case where the MME 300 or other management node (e.g., the HSS 400) determines an eNodeB to be linked on the basis of the attribute of the terminal device 100 that sends a request.

The information on the terminal device 100 is registered in the HSS 400 in advance. The information on the terminal device 100 that is registered in the HSS 400 may include, in one example, information on geographical conditions, information on the contract that data related to a particular application is allowed to be cached, or the like. Thus, before the terminal device 100 issues a request in the application layer, that is, at the time of setup of the EPS bearer, the MME 300 acquiring the attribute of the terminal device 100 from the HSS 400 makes it possible to determine an eNodeB to cache data of the application layer that is carried by the bearer.

When the terminal device 100 sends a request to activate the EPS bearer (step S111), the MME 300 acquires the attribute of the terminal device 100 that sends the request from the HSS 400, and determines a range of an eNodeB to be linked in association with the attribute of the terminal device 100 (step S112). The processing in step S112 is executed by, in one example, the control unit 333. FIG. 15 illustrates an example in which the eNodeBs 200a and 200b are determined as eNodeBs to be linked by the MME 300.

It is possible for the MME 300 to decide to what extent the eNodeBs are necessary to be linked by extracting geographical information of the terminal device 100 from the HSS 400. In addition, if there is a contract that data is allowed to be cached and information indicating how much adjacent eNodeB to be cached is written with the contract information stored in the HSS 400, it is possible for the MME 300 to determine an eNodeB to be linked in accordance with the contract information.

Further, if the information on the terminal device 100 that is about to play the same network game is registered in the MME 300 or the HSS 400, the MME 300 is capable of specifying an eNodeB to which the terminal devices 100 simultaneously using the mobile network belong. Thus, the MME 300 is capable of determining these specified eNodeBs as the eNodeBs to be linked.

The MME 300, when determining an eNodeB to be linked in association with the terminal device 100, notifies the determined eNodeB that it is determined as an eNodeB to be linked (steps S113 and S114). The processing in steps S113 and S114 is executed by, in one example, the control unit 333 that causes the communication unit 310 to transmit the notification. In FIG. 15, the eNodeBs 200a and 200b are determined as eNodeBs to be linked, and so the MME 300 notifies the eNodeBs 200a and 200b of the result.

The subsequent operation is similar to the procedure illustrated in FIG. 14. In other words, when the terminal device 100 transmits a request for predetermined content (referred to as content A) in the application layer to the eNodeB 200a (step S115), the request is transferred from the eNodeB 200a to the server device 800 via the S-GW 500 and the P-GW 600. The server device 800 returns a response for the content A in the application layer to the eNodeB 200a (step S116). The eNodeB 200a is notified that it is determined as an eNodeB to be linked from the MME 300, and caches the content A (step S117).

The eNodeB 200a, when caching the content A returned from the server device 800, returns a response for the content A in the application layer to the terminal device 100 (step S118). Furthermore, the eNodeB 200a is notified that it is linked with the eNodeB 200b from MME 300, and so decides to redirect the content A to cause the content A to be cached in the eNodeB 200b (step S119).

Then, the eNodeB 200a transfers the content A via the X2 interface to cause the eNodeB 200b to cache the content A (step S120). The eNodeB 200 is notified that it is determined as an eNodeB to be linked from the MME 300, and so caches the content A transferred from eNodeB 200a (step S121).

In this second operation example, the range of the eNodeB to be linked is determined in association with the attribute of the terminal device 100 and the result is notified to the determined eNodeB from the MME 300. Thus, it is possible to hold the cache data by causing it to be linked between a plurality of eNodeBs.

FIG. 15 also illustrates an example in the case where the terminal device 100 first accesses the eNodeB 200a and so causes the eNodeBs 200a and 200b to hold the cache data by causing it to be linked. However, if the terminal device 100 first accesses the eNodeB 200b, it is natural that the eNodeB 200b acquires and caches data from the server device 800 and transfers the cached data to the eNodeB 200a via the X2 interface. The operation of the eNodeBs 200a and 200b as described above makes it possible to cause the eNodeBs 200a and 200b to hold the cached data by causing it to be linked.

1.3.3. Third Operation Example

Subsequently, as a third operation example, an example is described in which the MME 300 or other management node (e.g., the HSS 400) determines an eNodeB to be linked on the basis of a request from the terminal device 100.

Figure 16:
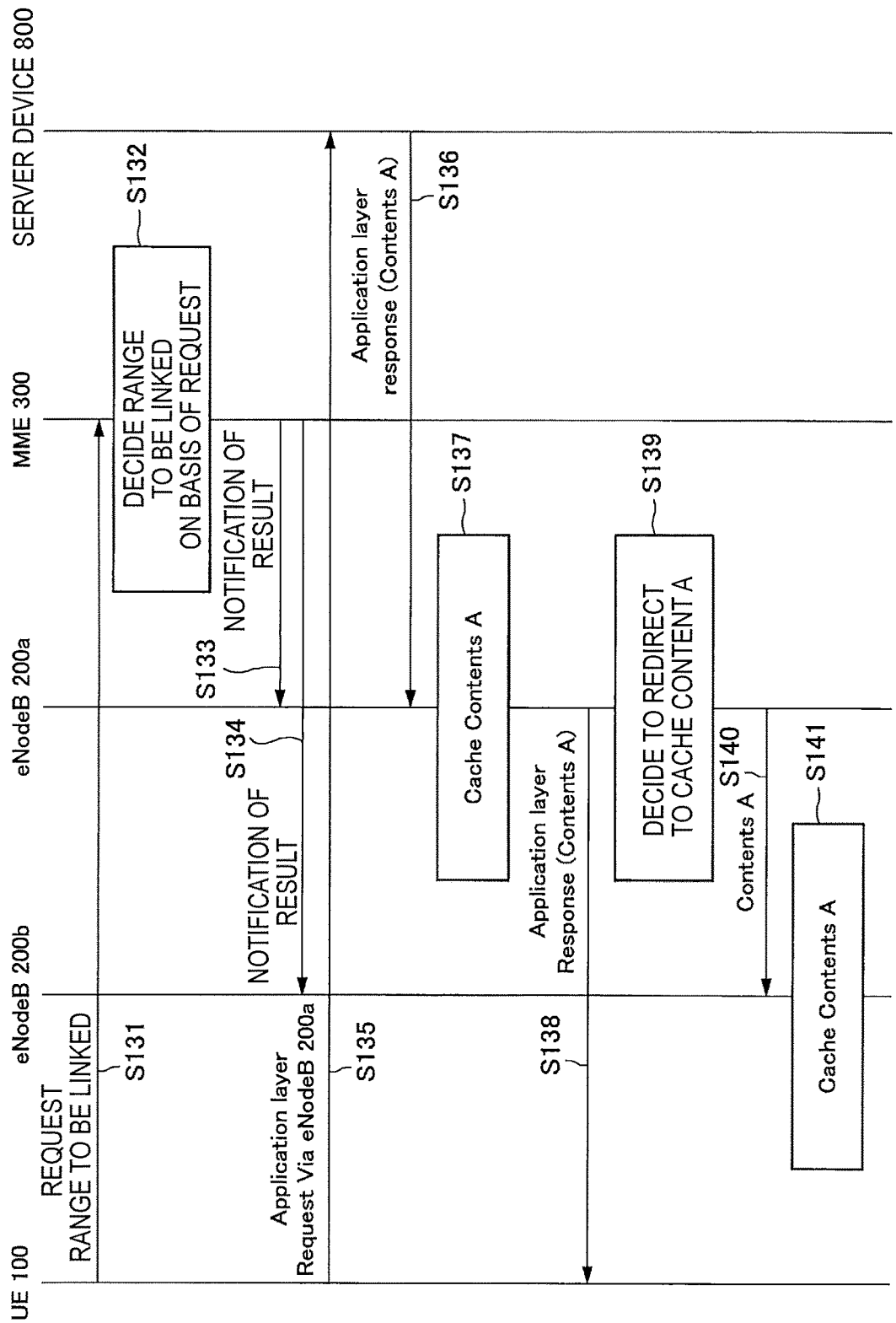
FIG. 16 is a flow diagram illustrating an operation example of a mobile network according to an embodiment of the present disclosure.

FIG. 16 is a flow diagram illustrating an operation example of the mobile network according to an embodiment of the present disclosure. FIG. 16 illustrates an operation example in the case where the MME 300 or other management node (e.g., the HSS 400) determines an eNodeB to be linked on the basis of a request from the terminal device 100.

The terminal device 100, which first intends to send a request in the application layer, can request a range of an eNodeB to be linked or the type of an application that is desired to be linked from the MME 300, when the EPS bearer corresponding to the request is newly created. In the case where the request for the range of an eNodeB to be linked from the terminal device 100 is acceptable, the MME 300 sets the range of the eNodeB to be linked to each eNodeB.

When the terminal device 100 sends the range of the eNodeB to be linked (step S131), the MME 300 decides the range of the eNodeB to be linked on the basis of the request (step S132). The processing in step S132 is executed by, in one example, the control unit 333. FIG. 16 illustrates an example in which the MME 300 determines eNodeBs 200a and 200b as the eNodeBs to be linked on the basis of a request from the terminal device 100. Moreover, in FIG. 16, the terminal device 100 sends the range of the eNodeB to be linked, but the terminal device 100 may send the type of the application that is desired to be linked. The MME 300 decides the range of the eNodeB to be linked on the basis of the type of the application that is desired to be linked.

The MME 300, when determining the eNodeB to be linked in association with the terminal device 100, notifies the determined eNodeB that it is determined as the eNodeB to be linked (steps S133 and S134). The processing in steps S133 and S134 is executed, in one example, by the control unit 333 that causes the communication unit 310 to transmit the notification. In FIG. 16, the eNodeBs 200a and 200b are determined as eNodeBs to be linked, and so the MME 300 notifies the eNodeBs 200a and 200b of the result.

The subsequent operation is similar to the procedure illustrated in FIG. 14 or FIG. 15. In other words, when the terminal device 100 transmits a request for predetermined content (referred to as content A) in the application layer to the eNodeB 200a (step S135), the request is transferred from the eNodeB 200a to the server device 800 via the S-GW 500 and the P-GW 600. The server device 800 returns a response for the content A in the application layer to the eNodeB 200a (step S136). The eNodeB 200a is notified that it is determined as an eNodeB to be linked from the MME 300, and so caches the content A (step S137).

The eNodeB 200a, when caching the content A returned from the server device 800, returns a response for the content A in the application layer to the terminal device 100 (step S138). Furthermore, eNodeB 200a is notified that it is linked with the eNodeB 200b from the MME 300, and so the eNodeB 200a decides to redirect the content A so that the content A is caused to be cached in the eNodeB 200b (step S139).

Then, the eNodeB 200a transfers the content A via the X2 interface to cause the eNodeB 200b to cache the content A (step S140). The eNodeB 200 is notified that it is determined as an eNodeB to be linked from the MME 300, and so caches the content A transferred from eNodeB 200a (step S141).

1.3.4. Fourth Operation Example

Subsequently, as a fourth operation example, an example is described in which the MME 300 or other management node (e.g., the HSS 400) determines an eNodeB to be linked on the basis of the type of the application.

Figure 17:
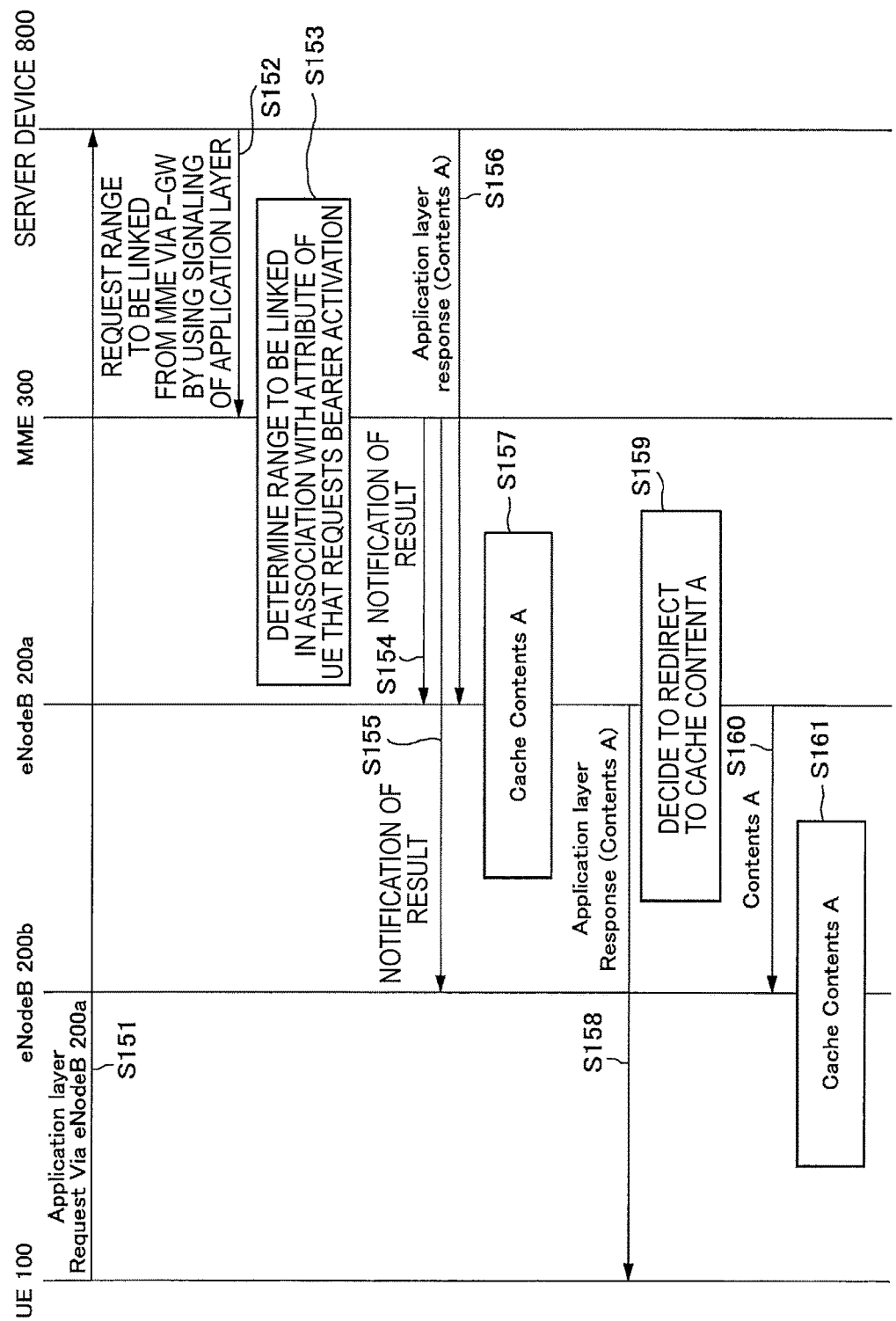
FIG. 17 is a flow diagram illustrating an operation example of a mobile network according to an embodiment of the present disclosure.

FIG. 17 is a flow diagram illustrating an operation example of the mobile network according to an embodiment of the present disclosure. FIG. 17 illustrates an operation example in the case where the MME 300 or other management node (e.g., the HSS 400) determines an eNodeB to be linked on the basis of the type of the application.

The MME 300 is also capable of changing the range of an eNodeB to be linked depending on the type of the application. The MME 300 determines the range of an eNodeBs to be linked, which is necessary for respective applications in the application layer. The attribute of the application layer do not necessarily fall within the range of linkage of eNodeBs, and it may be narrower or wider. The MME 300 or other management node receiving the attribute sets the range of the eNodeB to be linked to each eNodeB.

When the terminal device 100 transmits a request for predetermined content (referred to as content A) in the application layer to the eNodeB 200a (step S151), the request is transferred from the eNodeB 200a via the S-GW 500 and the P-GW 600 to the server device 800. The server device 800 requests the range of an eNodeB to be linked from the MME 300 via the P-GW 600 by using signaling of the application layer (step S152).

The MME 300, when receiving the request from the server device 800, determines the range of the eNodeB to be linked in association with the attribute of the terminal device 100 that requests the activation of the EPS bearer (step S153). The processing in step S153 is executed by, in one example, the control unit 333. FIG. 17 illustrates an example in which the MME 300 determines the eNodeBs 200a and 200b as the eNodeBs to be linked.

The MME 300, when determining the eNodeB to be linked in association with the terminal device 100, notifies the determined eNodeB that it is determined as the eNodeB to be linked (steps S154 and S155). The processing in steps S154 and S155 are executed, in one example, by the control unit 333 that causes the communication unit 310 to transmit the notification. In FIG. 17, the eNodeBs 200a and 200b are determined as eNodeBs to be linked, and so the MME 300 notifies the eNodeBs 200a and 200b of the result.

Then, the server device 800 returns a response for the content A in the application layer to the eNodeB 200a (step S156). The eNodeB 200a is notified that it is determined as the eNodeB to be linked from the MME 300, and so caches the content A (step S157)

The eNodeB 200a, when caching the content A returned from the server device 800, returns a response for the content A in the application layer to the terminal device 100 (step S158). Furthermore, the eNodeB 200a is notified that it is linked with the eNodeB 200b from the MME 300, and so decides to redirect the content A so that the content A is caused to be cached in the eNodeB 200b (step S159).

Then, the eNodeB 200a transfers the content A via the X2 interface to cause the eNodeB 200b to cache the content A (step S160). The eNodeB 200 is notified that it is determined as the eNodeB to be linked from the MME 300, and so caches the content A transferred from eNodeB 200a (step S161).

1.3.5. Fifth Operation Example

Subsequently, as a fifth operation example, an example is described in which the MME 300 or other management node (e.g., the HSS 400) determines an eNodeB to be linked on the basis of information on another terminal device 100b, which is specified from a terminal device 100a.

Figure 18:
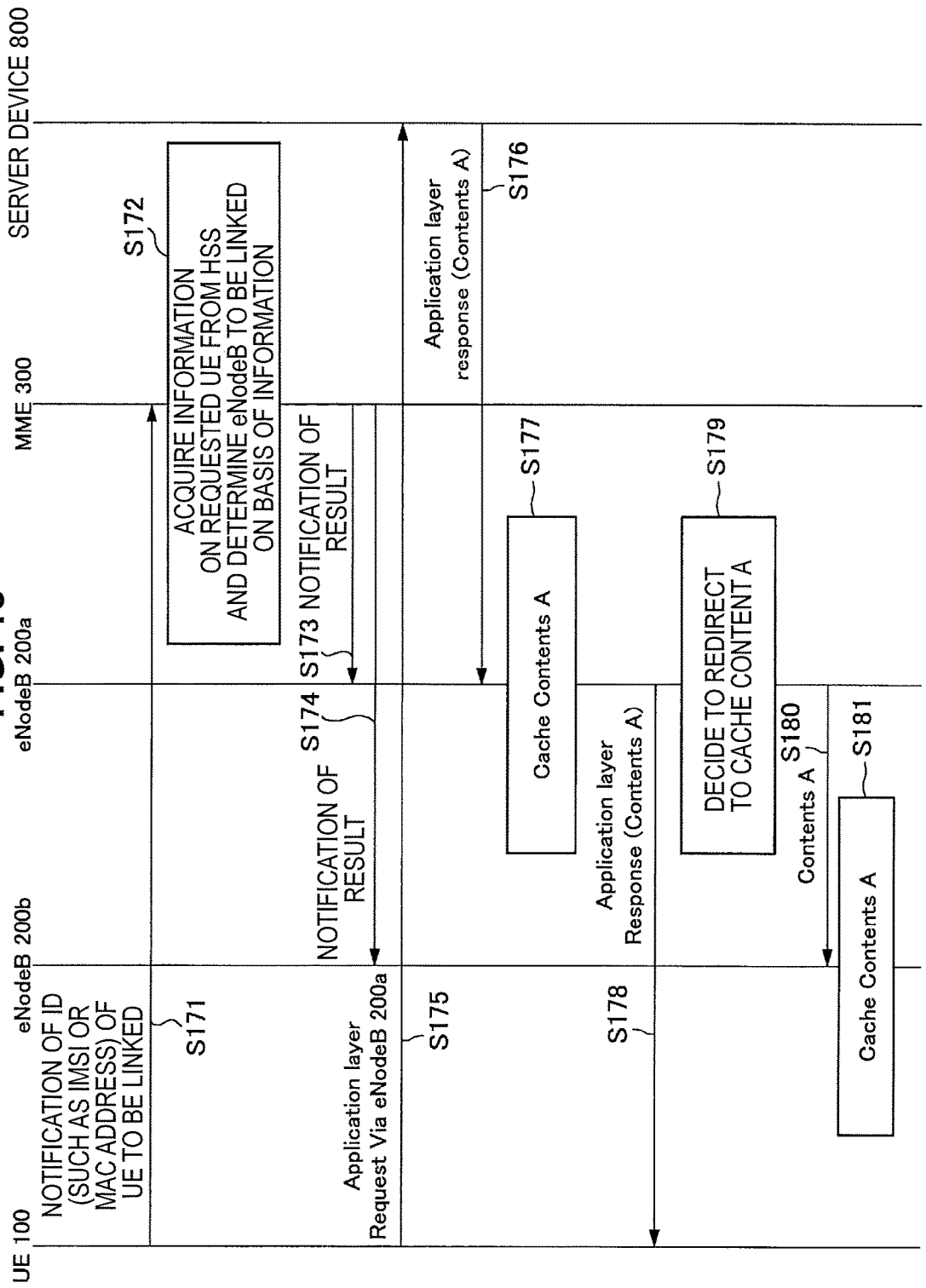
FIG. 18 is a flow diagram illustrating an operation example of a mobile network according to an embodiment of the present disclosure.

FIG. 18 is a flow diagram illustrating an operation example of the mobile network according to an embodiment of the present disclosure. FIG. 18 illustrates an operation example in the case where the MME 300 or other management node (e.g., the HSS 400) determines an eNodeB to be linked in association with information on the other terminal device 100b specified from the terminal device 100a.

The terminal device 100a (or the server device 800) makes a request to the MME 300 for the terminal device 100b to be linked by using information (IMSI or an ID for specifying a terminal device such as MAC address) used to identify the terminal device 100b to be linked (step S171).

In the case where the terminal device 100b is RRC connected to a particular eNodeB (e.g., the eNodeB 200b), the MME 300 is capable of specifying the eNodeB by exchange with the HSS 400.

Thus, the MIME 300 determines an eNodeB to be linked so that the eNodeB 200a is linked to cache it with the eNodeB 200b that is RRC connected (step S172), and notifies the determined eNodeB that it is determined as the eNodeB to be linked (steps S173 and S174).

Moreover, in the case where the terminal device 100b is in RRC idle mode for a particular eNodeB (e.g., the eNodeB 200b), the eNodeB 200b performs, in one example, paging to the terminal device 100b. In this case, if there is a response from the terminal device 100b, the MME 300 sets the eNodeB 200b as a target to be linked.

The subsequent operation is similar to the procedure illustrated in FIG. 14 or 15. In other words, when the terminal device 100 transmits a request for predetermined content (referred to as content A) in the application layer to the eNodeB 200a (step S175), the request is transferred from the eNodeB 200a to the server device 800 via the S-GW 500 and the P-GW 600. The server device 800 returns a response for the content A in the application layer to the eNodeB 200*a* (step S176). The eNodeB 200*a* is notified that it is determined as the eNodeB to be linked from the MME 300, and caches the content A (step S177).

The eNodeB 200*a*, when caching the content A returned from the server device 800, returns a response for the content A in the application layer to the terminal device 100 (step S178). Furthermore, the eNodeB 200*a* is notified that it is linked with the eNodeB 200*b* from MME 300, and so decides to redirect the content A to cause the content A to be cached in the eNodeB 200*b* (step S179).

Then, the eNodeB 200*a* transfers the content A via the X2 interface to cause the eNodeB 200*b* to cache the content A (step S180). The eNodeB 200 is notified that it is determined as the eNodeB to be linked from the MME 300, and so caches the content A transferred from eNodeB 200*a* (step S181).

As described above, the MME 300 determines an eNodeB that satisfies a predetermined condition as an eNodeB that is caused to manage the data by causing it to be linked and notifies the determined eNodeB that it is determined as the eNodeB, which is caused to manage the data by causing it to be linked. Each of the eNodeBs receiving the notification, when acquiring data from the server in which the original data is stored, transfers the data to another eNodeB to be linked. These operations by the MME 300 and the eNodeB 200 allow the terminal device 100 to improve the response time from when the data is requested to when the data is acquired.

Figure 19:
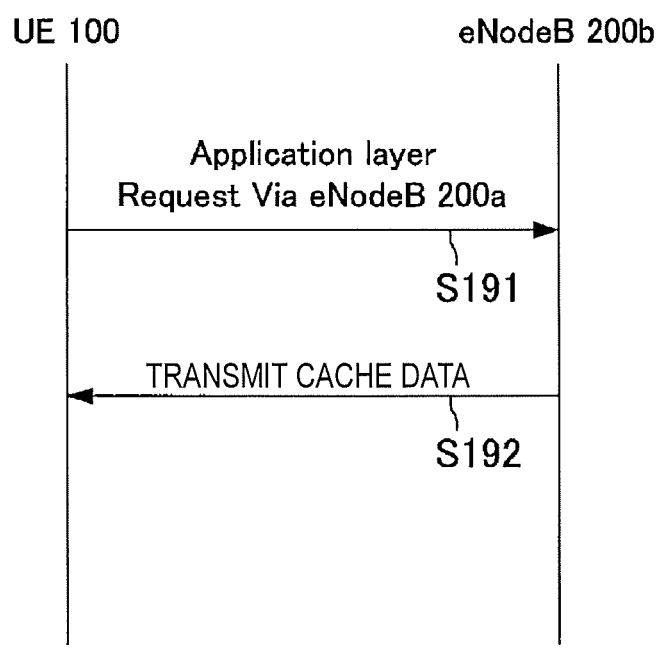
FIG. 19 is a flow diagram illustrating an effect obtained by a mobile network according to an embodiment of the present disclosure.

Subsequently, advantageous effects of an embodiment of the present disclosure are described. FIG. 19 is a flow diagram illustrated to describe advantageous effects according to an embodiment of the present disclosure, and illustrates an operation example when the terminal device 100 accesses the eNodeB 200*b* for the first time. The flow diagram illustrated in FIG. 19 is based on the assumption that the eNodeB 200*b* caches the data of the content A by any of the above-described operations.

When the terminal device 100 transmits a request for predetermined content (referred to as content A) in the application layer to the eNodeB 200*b* (step S191), the eNodeB 200*b* has already cached data of the content A, and so returns the cached data to the terminal device 100 (step S192).

In other words, the eNodeB 200*b* returns data to the terminal device 100 without transferring the request from the eNodeB 200*b* to the server device 800 via the S-GW 500 and the P-GW 600. Thus, even when the terminal device 100 accesses the eNodeB 200*b* for the first time, it is possible to improve significantly the response time, as compared with the case where the eNodeB 200*b* does not cache data of the content A.

Figure 20:
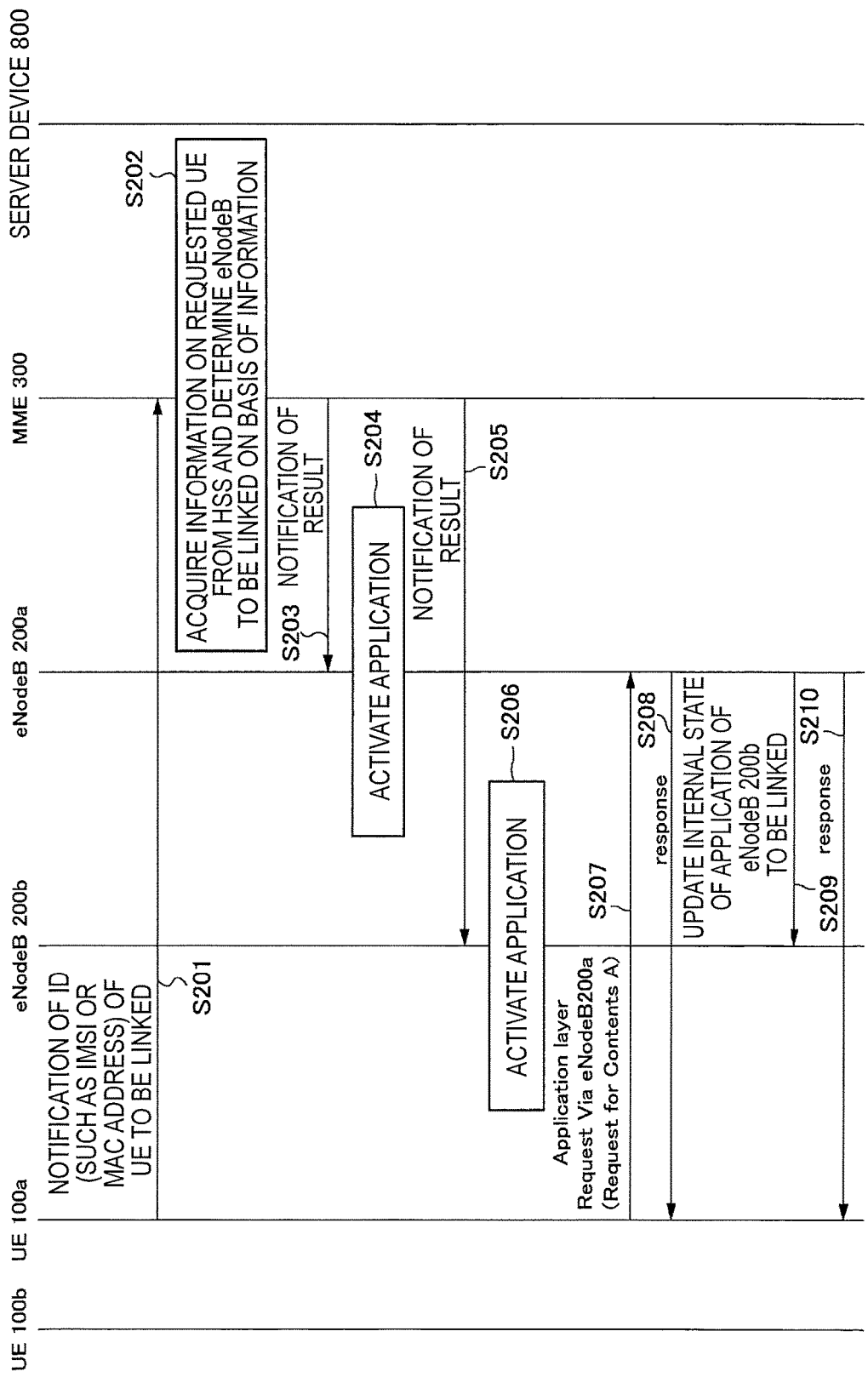
FIG. 20 is a flow diagram illustrating an effect obtained by a mobile network according to an embodiment of the present disclosure.

FIG. 20 is a flow diagram illustrated to describe advantageous effects according to an embodiment of the present disclosure, and illustrates an operation example when the eNodeBs 200*a* and 200*b* activate an application in accordance with an instruction of the MME 300.

The terminal device 100*a* (or the server device 800) makes a request to the MME 300 for the terminal device 100*b* to be linked by using information (IMSI or an ID for specifying a terminal device such as MAC address) used to identify the terminal device 100*b* to be linked (step S201).

In the case where the terminal device 100*b* is RRC connected to a particular eNodeB (e.g., the eNodeB 200*b*), the MME 300 is capable of specifying the eNodeB by exchange with the HSS 400.

Thus, the MME 300 determines an eNodeB to be linked so that the eNodeB 200*a* is linked to activate an application with the eNodeB 200*b* that is RRC connected (step S202), and notifies the determined eNodeB that it is determined as the eNodeB to be linked (steps S203 and S205).

The eNodeBs 200*a* and 200*b*, which receive the notification from the MME 300, activate the application on the basis of the notification (steps S204 and S206).

Then, when the terminal device 100*a* transmits a request for a predetermined application (referred to as content A) in the application layer to the eNodeB 200*a* (step S207), the eNodeB 200*a* returns a response to the request to the terminal device 100*a* (step S208). In addition, the eNodeB 200*a* sends an instruction to update the internal state of the application to the eNodeB 200*b* to be linked (step S209).

The eNodeB 200*b*, which updates the internal state of the application, transmits a response to the terminal device 100*b* that belongs to the eNodeB 200*b* and uses the same application (step S210).

The operations performed by the eNodeBs 200*a* and 200*b* as illustrated in FIG. 20 make it possible to update and supply the internal state of the application by causing it to be linked to the terminal device 100*a* and 100*b* that use the same application. In other words, the eNodeBs 200*a* and 200*b* activate the same application, and so it is possible to return a response to the request from the terminal device 100*a* to the terminal device 100*b* in a short time.

2. Application Examples

The technology according to the present disclosure is applicable to various products. In one example, the MME 300 may be implemented as a server of any type of server such as a tower server, a rack server, or a blade server. In addition, the MME 300 may be a control module mounted in a server (e.g., an integrated circuit module configured in one die, or a card or a blade inserted into a slot of a blade server).

Further, the eNodeB 200 may be implemented as any type of evolved node B (eNB), in one example, a macro eNB, a small eNB, or the like. The small eNB may be an eNB that covers a smaller cell than a macro cell, such as a pico eNB, a micro eNB, or a home (femto) eNB. Alternatively, the eNodeB 200 may be implemented as other types of base stations such as a node B or a base transceiver station (BTS). The eNodeB 200 may include a main body that controls wireless communication (also referred to as a base station device) and one or more remote radio heads (RRHs) disposed in a place different from the main body. In addition, various types of terminals to be described below may operate as the eNodeB 200 by temporarily or semi-permanently executing the functions of a base station.

In addition, in one example, the terminal device 100 may be implemented as a mobile terminal such as a smartphone, a tablet personal computer (PC), a notebook PC, a portable game terminal, a portable/dongle type mobile router, or a digital camera, or may be implemented as an in-vehicle terminal such as a car navigation device. In addition, the terminal device 100 may be implemented as a terminal that performs machine-to-machine (M2M) communication (also referred to as a machine type communication (MTC) terminal). Furthermore, the terminal device 100 may be a wireless communication module mounted in such a terminal (e.g., an integrated circuit module configured in one die).

2-1. Example of Application for Control Entity

Figure 21:
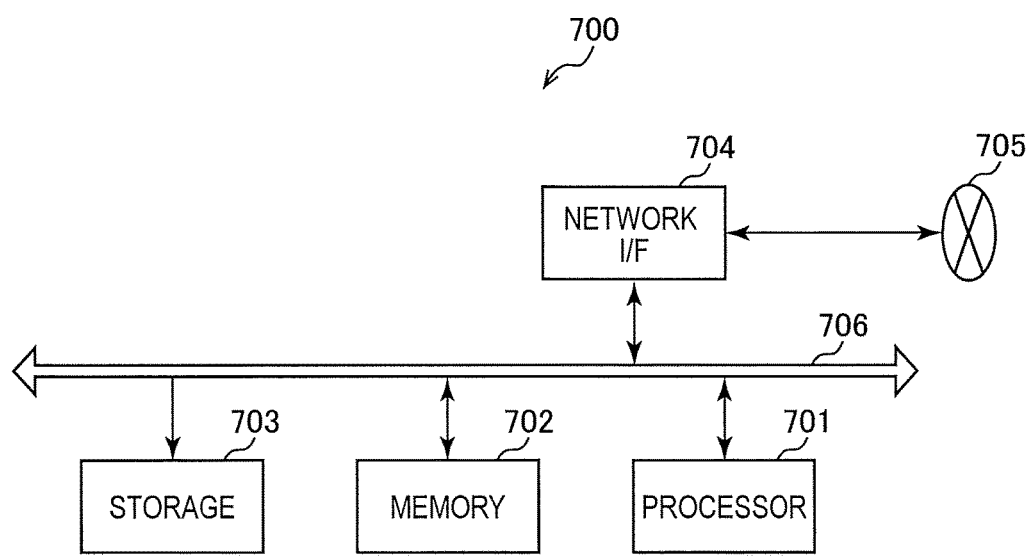
FIG. 21 is a block diagram illustrating an example of a schematic configuration of a server 700 to which the technology according to the present disclosure is applicable.

FIG. 21 is a block diagram illustrating an example of a schematic configuration of a server 700 to which the technology according to the present disclosure is applicable. The server 700 is configured to include a processor 701, a memory 702, storage 703, a network interface 704, and a bus 706.

The processor 701 may be, in one example, a central processing unit (CPU) or a digital signal processor (DSP) and controls the server 700 to perform various functions. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface used to allow the server 700 to connect to a wired communication network 705. The wired communication network 705 may be a core network such as an evolved packet core (EPC), or may be a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 21, one or more components included in the processing unit 330 described with reference to FIG. 13 (the information acquisition unit 331 and/or the control unit 333) may be mounted on the processor 701. As an example, a program for causing a processor to function as the one or more components (i.e., a program for causing a processor to execute operations of the one or more components) may be installed in the server 700, and the processor 701 may execute the program. As another example, a module including the processor 701 and the memory 702 may be equipped in the server 700, and the one or more components may be mounted on the module. In this case, the module may store a program for causing a processor to function as the one or more components in the memory 702 and the processor 701 may execute the program. The server 700 or the module may be provided as a device including the above-described one or more components as described above, or the program for causing a processor to function as the one or more components may be provided. In addition, a readable recording medium in which the program is recorded may be provided.

2-2. Example of Application for Base Station

First Application Example

Figure 22:
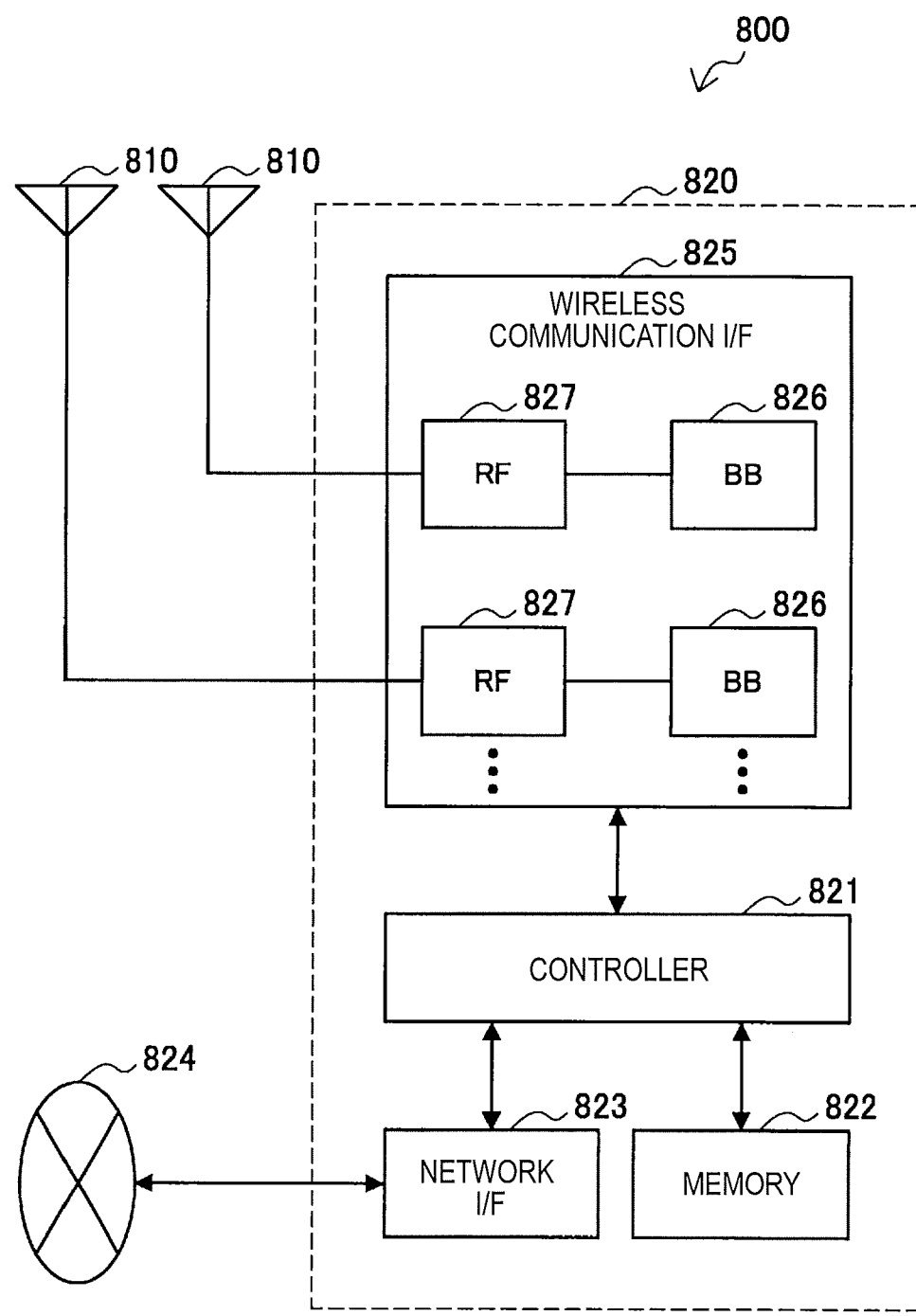
FIG. 22 is a block diagram illustrating a first example of a schematic configuration of an eNB to which the technology according to the present disclosure is applicable.

FIG. 22 is a block diagram illustrating a first example of a schematic configuration of an eNB to which the technology according to the present disclosure is applicable. An eNB 800 includes one or more antennas 810 and a base station device 820. Each antenna 810 and the base station device 820 may be connected to each other via an RF cable.

Each of the antennas 810 includes a single or multiple antenna elements (e.g., multiple antenna elements that constitute an MIMO antenna), and is used for the base station device 820 to transmit and receive radio signals. The eNB 800 may include the multiple antennas 810, as illustrated in FIG. 22. In one example, the multiple antennas 810 may be compatible with multiple frequency bands used by the eNB 800. Moreover, although FIG. 22 illustrates the example in which the eNB 800 includes the multiple antennas 810, the eNB 800 may also include a single antenna 810.

The base station device 820 is configured to include a controller 821, a memory 822, a network interface 823, and a wireless communication interface 825.

The controller 821 may be, in one example, a CPU or a DSP, and causes the higher layer of the base station device 820 to operate various functions. In one example, the controller 821 generates a data packet from data in a signal processed by the wireless communication interface 825, and transfers the generated packet via the network interface 823. The controller 821 may bundle data from multiple base band processors to generate a bundled packet, and may transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (e.g., a list of terminals, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to the core network node or the other eNB through a logical interface (e.g., S1 interface or X2 interface). The network interface 823 may also be a wired communication interface or a wireless communication interface for wireless backhaul. If the network interface 823 is the wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal located in a cell of the eNB 800 via the antenna 810. The wireless communication interface 825 may typically include, in one example, a baseband (BB) processor 826 and an RF circuit 827. The BB processor 826 may perform, in one example, encoding/decoding, modulating/demodulating, and multiplexing/de-multiplexing, and performs various types of signal processing of layers (e.g., L1, medium access control (MAC), radio link control (RLC), and a packet data convergence protocol (PDCP)). The BB processor 826 may have a part or all of the above-described logical functions instead of the controller 821. The BB processor 826 may be a module including a memory that stores a communication control program, a processor that executes the program, and the related circuits. The function of the BB processor 826 may be changeable by updating the above-described program. In addition, the module may be a card or a blade that is inserted into a slot of the base station device 820. Alternatively, the module may also be a chip that is mounted on the card or the blade. The RF circuit 827 may include, in one example, a mixer, a filter, and an amplifier, and transmits and receives radio signals via the antenna 810.

The wireless communication interface 825 may include the multiple BB processors 826, as illustrated in FIG. 22. In one example, the multiple BB processors 826 may be compatible with multiple frequency bands used by the eNB 800. In addition, the wireless communication interface 825 may include the multiple RF circuits 827, as illustrated in FIG. 22. In one example, the multiple RF circuits 827 may be compatible with multiple antenna elements. Moreover, although FIG. 22 illustrates the example in which the wireless communication interface 825 includes the multiple BB processors 826 and the multiple RF circuits 827, the wireless communication interface 825 may include a single BB processor 826 or a single RF circuit 827.

Second Application Example

Figure 23:
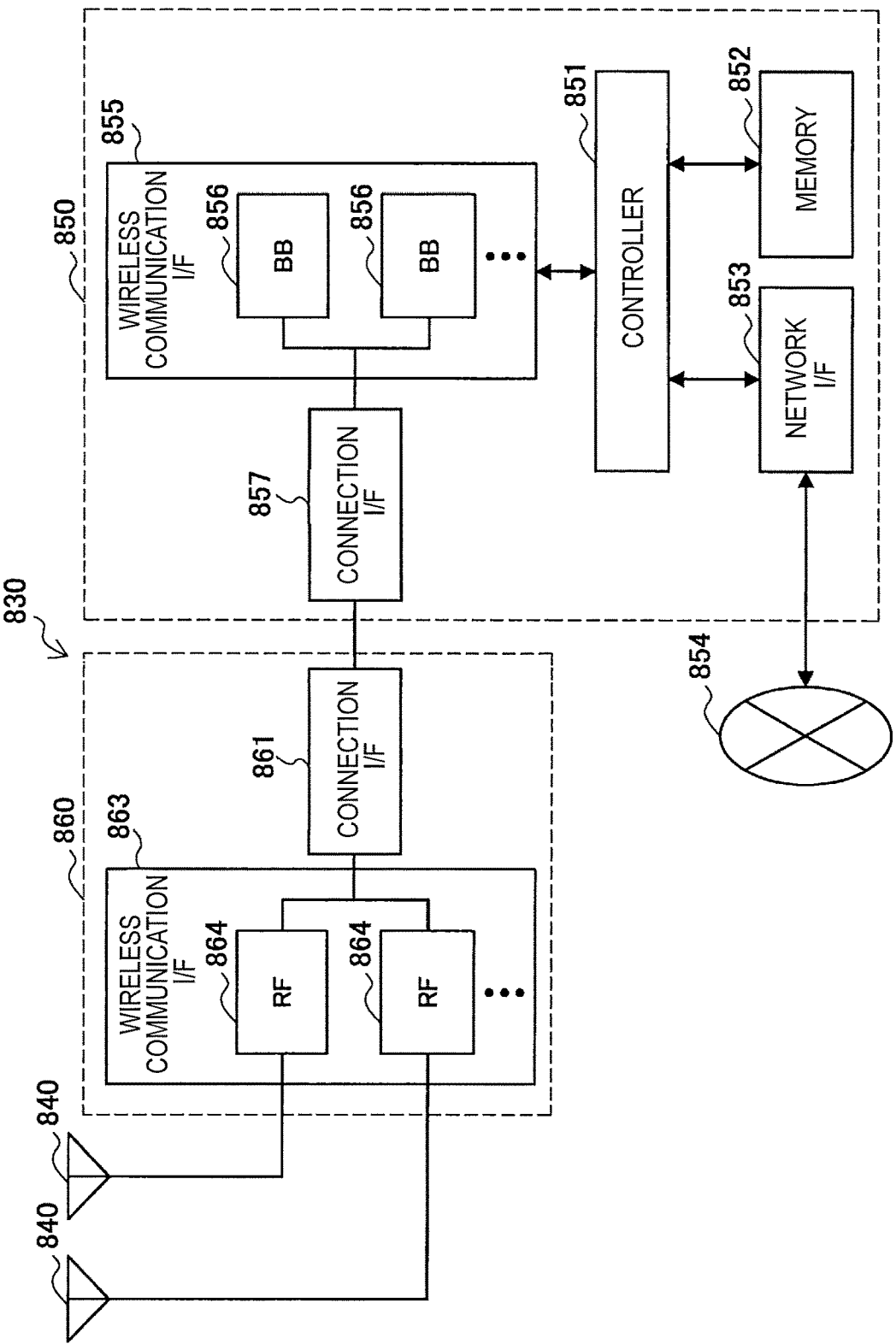
FIG. 23 is a block diagram illustrating a second example of the schematic configuration of the eNB to which the technology according to the present disclosure is applicable.

FIG. 23 is a block diagram illustrating a second example of a schematic configuration of an eNB to which the technology according to the present disclosure is applicable. An eNB 830 includes one or more antennas 840, a base station device 850, and an RRH 860. Each antenna 840 and the RRH 860 may be connected to each other via an RF cable. In addition, the base station device 850 and the RRH 860 may be connected to each other over a high-speed line such as an optical fiber cable.

Each of the antennas 840 includes a single or multiple antenna elements (e.g., multiple antenna elements that constitute an MIMO antenna), and is used for the RRH 860 to transmit and receive radio signals. The eNB 830 may include the multiple antennas 840 as illustrated in FIG. 23. In one example, the multiple antennas 840 may be compatible with multiple frequency bands used by the eNB 830. Moreover, although FIG. 23 illustrates the example in which the eNB 830 includes the multiple antennas 840, the eNB 830 may include a single antenna 840.

The base station device 850 is configured to include a controller 851, a memory 852, a network interface 853, a wireless communication interface 855, and a connection interface 857. The controller 851, the memory 852, and the network interface 853 are respectively similar to the controller 821, the memory 822, and the network interface 823 described with reference to FIG. 22.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, in one example, a BB processor 856. The BB processor 856 is similar to the BB processor 826 described with reference to FIG. 22, except that the BB processor 856 is connected to an RF circuit 864 of the RRH 860 via the connection interface 857. The wireless communication interface 855 may include the multiple BB processors 856, as illustrated in FIG. 23. In one example, the multiple BB processors 856 may be compatible with multiple frequency bands used by the eNB 830. Moreover, although FIG. 23 illustrates the example in which the wireless communication interface 855 includes the multiple BB processors 856, the wireless communication interface 855 may include a single BB processor 856.

The connection interface 857 is an interface for connecting the base station device 850 (the wireless communication interface 855) to the RRH 860. The connection interface 857 may also be a communication module for communication over the above-described high-speed line that connects the base station device 850 (the wireless communication interface 855) to the RRH 860.

Further, the RRH 860 is configured to include a connection interface 861 and a wireless communication interface 863.

The connection interface 861 is an interface for connecting the RRH 860 (the wireless communication interface 863) to the base station device 850. The connection interface 861 may also be a communication module for communication over above-described high-speed line.

The wireless communication interface 863 transmits and receives radio signals via the antenna 840. The wireless communication interface 863 may typically include, in one example, the RF circuit 864. The RF circuit 864 may include, in one example, a mixer, a filter, and an amplifier, and transmits and receives radio signals via the antenna 840. The wireless communication interface 863 may include multiple RF circuits 864, as illustrated in FIG. 23. In one example, the multiple RF circuits 864 may support multiple antenna elements. Moreover, although FIG. 23 illustrates the example in which the wireless communication interface 863 includes the multiple RF circuits 864, the wireless communication interface 863 may also include a single RF circuit 864.

In the eNB 800 and the eNB 830 illustrated in FIGS. 22 and 23, one or more components included in the processing unit 250 (the information acquisition unit 251 and/or the control unit 253) described with reference to FIG. 11 may be mounted on the wireless communication interface 855 and/or the wireless communication interface 863. Alternatively, at least some of these components may be mounted on the controller 851. As an example, a module that includes a part (e.g., the BB processor 856) or all of the wireless communication interface 855 and/or the controller 851 may be equipped in eNB 830, and the one or more components may be mounted on the module. In this case, the module may store a program for causing the processor to function as the one or more components (i.e., a program for causing the processor to execute operations of the one or more components) and may execute the program. As another example, the program for causing the processor to function as the one or more components may be installed in the eNB 830, and the wireless communication interface 855 (e.g., the BB processor 856) and/or the controller 851 may execute the program. As described above, the eNB 830, the base station device 850, or the module may be provided as a device that includes the one or more components, and the program for causing the processor to function as the one or more components may be provided. In addition, a readable recording medium in which the program is recorded may be provided.

In addition, in the eNB 830 illustrated in FIG. 23, in one example, the wireless communication unit 220 described with reference to FIG. 11 may be mounted on the wireless communication interface 863 (e.g., the RF circuit 864). Moreover, the antenna unit 210 may be mounted on the antenna 840. In addition, the network communication unit 230 may be mounted on the controller 851 and/or the network interface 853.

2-3. Example of Application for Terminal Device

First Application Example

Figure 24:
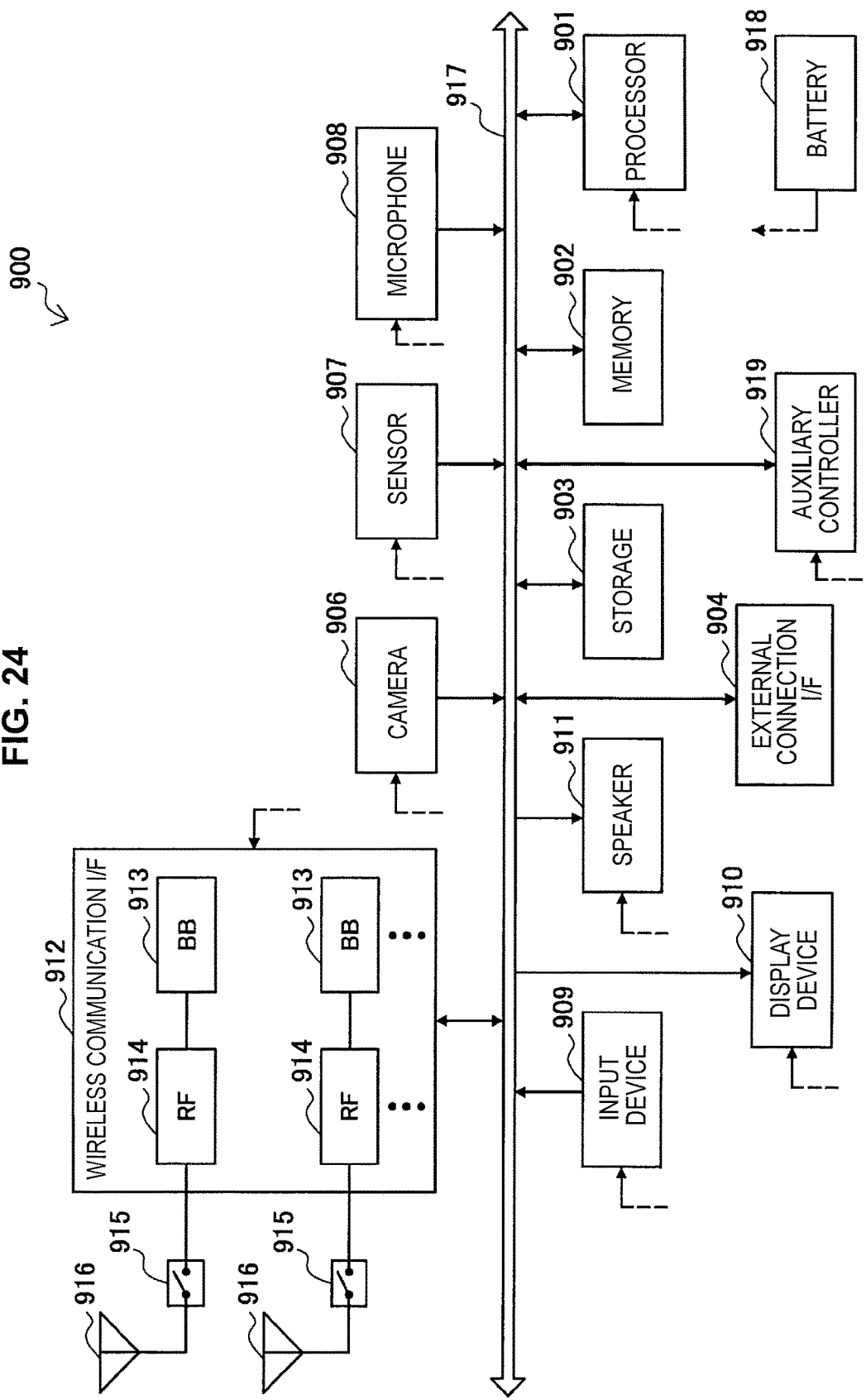
FIG. 24 is a block diagram illustrating an example of a schematic configuration of a smartphone 900 to which the technology according to the present disclosure is applicable.

FIG. 24 is a block diagram illustrating an example of a schematic configuration of a smartphone 900 to which the technology according to the present disclosure is applicable. The smartphone 900 is configured to include a processor 901, a memory 902, storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, in one example, a CPU or a system on chip (SoC), and controls functions of the application layer or other layer of the smartphone 900. The memory 902 includes RAM and ROM, and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge-coupled device (CCD) or a complementary-metal-oxide semiconductor (CMOS), and generates a captured image. The sensor 907 may include a group of sensors such as a positioning sensor, a gyro sensor, a geomagnetic sensor, and an acceleration sensor. The microphone 908 converts sounds that are input to the smartphone 900 to audio signals. The input device 909 includes, in one example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, in one example, a BB processor 913 and an RF circuit 914. The BB processor 913 may perform, in one example, encoding/decoding, modulating/demodulating, and multiplexing/demultiplexing, and performs various types of signal processing for wireless communication. Meanwhile, the RF circuit 914 may include, in one example, a mixer, a filter, and an amplifier, and transmits and receives radio signals via the antenna 916. The wireless communication interface 912 may also be a one-chip module that has the BB processor 913 and the RF circuit 914 integrated thereon. The wireless communication interface 912 may include the multiple BB processors 913 and the multiple RF circuits 914, as illustrated in FIG. 24. Moreover, although FIG. 24 illustrates the example in which the wireless communication interface 912 includes the multiple BB processors 913 and the multiple RF circuits 914, the wireless communication interface 912 may also include a single BB processor 913 or a single RF circuit 914.

Furthermore, the wireless communication interface 912 may support other types of wireless communication schemes such as a short-distance wireless communication scheme, a near field communication scheme, and a wireless local area network (LAN) scheme, in addition to a cellular communication scheme. In this case, the BB processor 913 and the RF circuit 914 may be included depending on each wireless communication scheme.

Each of the antenna switches 915 switches connection destinations of the antennas 916 between multiple circuits (e.g., circuits for different wireless communication schemes) included in the wireless communication interface 912.

Each of the antennas 916 includes a single or multiple antenna elements (e.g., multiple antenna elements that constitute an MIMO antenna), and is used for the wireless communication interface 912 to transmit and receive radio signals. The smartphone 900 may include the multiple antennas 916, as illustrated in FIG. 24. Moreover, although FIG. 24 illustrates the example in which the smartphone 900 includes the multiple antennas 916, the smartphone 900 may also include a single antenna 916.

Furthermore, the smartphone 900 may be configured to include the antenna 916 suitable for each wireless communication scheme. In this case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 24 via feeder lines shown partially by dashed lines in the figure. The auxiliary controller 919 causes the smartphone 900 to operate a minimum necessary function, in one example, in a sleep mode.

In the smartphone 900 illustrated in FIG. 24, one or more components included in the processing unit 140 (the information acquisition unit 141 and/or the control unit 143) described with reference to FIG. 10 may be mounted on the wireless communication interface 912. Alternatively, at least some of these components may be mounted on the processor 901 or the auxiliary controller 919. As an example, a module that includes a part (e.g., the BB processor 913) or all of the wireless communication interface 912, the processor 901, and/or the auxiliary controller 919 may be equipped in the smartphone 900, and the one or more components may be mounted on the module. In this case, the module may store a program for causing the processor to function as the one or more components (i.e., a program for causing the processor to execute operations of the one or more components) and may execute the program. As another example, the program for causing the processor to function as the one or more components may be installed in the smartphone 900, and the wireless communication interface 912 (e.g., the BB processor 913), the processor 901, and/or the auxiliary controller 919 may execute the program. As described above, the smartphone 900 or the module may be provided as a device that includes the one or more components, and the program for causing the processor to function as the one or more components may be provided. In addition, a readable recording medium in which the program is recorded may be provided.

In addition, in the smartphone 900 illustrated in FIG. 24, in one example, the wireless communication unit 120 described with reference to FIG. 10 may be mounted on the wireless communication interface 912 (e.g., the RF circuit 914). Moreover, the antenna unit 110 may be mounted on the antenna 916.

Second Application Example

Figure 25:
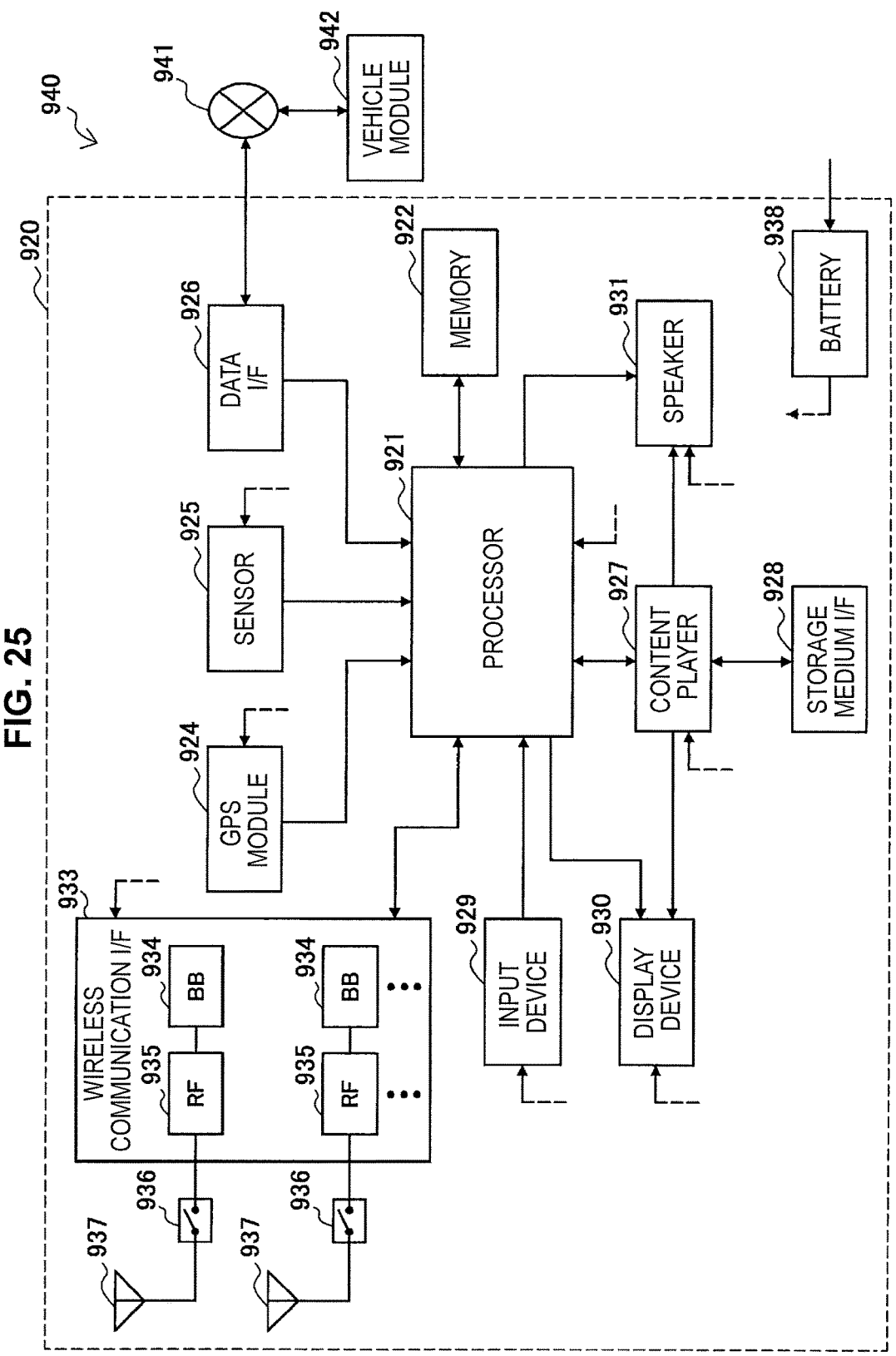
FIG. 25 is a block diagram illustrating an example of a schematic configuration of a car navigation device 920 to which the technology according to the present disclosure is applicable.

FIG. 25 is a block diagram illustrating an example of a schematic configuration of a car navigation device 920 to which the technology according to the present disclosure is applicable. The car navigation device 920 is configured to include a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, in one example, a CPU or a SoC, and controls the car navigation device 920 to perform a navigation function and other functions. The memory 922 includes RAM and ROM, and stores a program executed by the processor 921, and data.

The GPS module 924 uses GPS signals received from a GPS satellite to measure a position (e.g., latitude, longitude, and altitude) of the car navigation device 920. The sensor 925 may include a group of sensors such as a gyro sensor, a geomagnetic sensor, and a barometric sensor. The data interface 926 is connected to, in one example, an in-vehicle network 941 via a terminal that is not shown, and acquires data generated by the vehicle, such as vehicle speed data.

The content player 927 reproduces content stored in a storage medium (e.g., a CD and a DVD) that is inserted into the storage medium interface 928. The input device 929 includes, in one example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs the navigation function or the content that is reproduced as sounds.

The wireless communication interface 933 supports any cellular communication scheme such as LET and LTE-Advanced, and performs wireless communication. The wireless communication interface 933 may typically include, in one example, a BB processor 934 and an RF circuit 935. The BB processor 934 may perform, in one example, encoding/decoding, modulating/demodulating, and multiplexing/demultiplexing, and performs various types of signal processing for wireless communication. Meanwhile, the RF circuit 935 may include, in one example, a mixer, a filter, and an amplifier, and transmits and receives radio signals via the antenna 937. The wireless communication interface 933 may be a one-chip module having the BB processor 934 and the RF circuit 935 integrated thereon. The wireless communication interface 933 may include the multiple BB processors 934 and the multiple RF circuits 935, as illustrated in FIG. 25. Moreover, although FIG. 25 illustrates the example in which the wireless communication interface 933 includes the multiple BB processors 934 and the multiple RF circuits 935, the wireless communication interface 933 may also include a single BB processor 934 or a single RF circuit 935.

Furthermore, the wireless communication interface 933 may support other types of wireless communication schemes such as a short-distance wireless communication scheme, a near field communication scheme, and a wireless LAN scheme, in addition to a cellular communication scheme. In this case, the wireless communication interface 933 may include the BB processor 934 and the RF circuit 935 depending on each wireless communication scheme.

Each of the antenna switches 936 switches connection destinations of the antennas 937 between multiple circuits (e.g., circuits for different wireless communication schemes) included in the wireless communication interface 933.

Each of the antennas 937 includes a single or multiple antenna elements (e.g., multiple antenna elements that constitute an MIMO antenna), and is used for the wireless communication interface 933 to transmit and receive radio signals. The car navigation device 920 may include the multiple antennas 937, as illustrated in FIG. 25. Moreover, although FIG. 25 illustrates the example in which the car navigation device 920 includes the multiple antennas 937, the car navigation device 920 may also include a single antenna 937.

Furthermore, the car navigation device 920 may be configured to include the antenna 937 suitable for each wireless communication scheme. In that case, the antenna switches 936 may be omitted from the configuration of the car navigation device 920.

The battery 938 supplies power to each block of the car navigation device 920 illustrated in FIG. 25 via feeder lines shown partially by dashed lines in the figure. The battery 938 accumulates power supplied form the vehicle.

In the car navigation device 920 illustrated in FIG. 25, one or more components included in the processing unit 140 (the information acquisition unit 141 and/or the control unit 143) described with reference to FIG. 10 may be mounted on the wireless communication interface 933. Alternatively, at least some of these components may be mounted on the processor 921. As an example, a module that includes a part (e.g., the BB processor 934) or all of the wireless communication interface 933 and/or the processor 921 may be equipped in the car navigation device 920, and the one or more components may be mounted on the module. In this case, the module may store a program for causing the processor to function as the one or more components (i.e., a program for causing the processor to execute operations of the one or more components) and may execute the program. As another example, the program for causing the processor to function as the one or more components may be installed in the car navigation device 920, and the wireless communication interface 933 (e.g., the BB processor 934) and/or the processor 921 may execute the program. As described above, the car navigation device 920 or the module may be provided as a device that includes the one or more components, and the program for causing the processor to function as the one or more components may be provided. In addition, a readable recording medium in which the program is recorded may be provided.

In addition, in the car navigation device 920 illustrated in FIG. 25, the wireless communication unit 120 described with reference to FIG. 10, in one example, may be mounted on the wireless communication interface 933 (e.g., the RF circuit 935). Moreover, the antenna unit 110 may be mounted on the antenna 937.

Further, the technology according to the present disclosure may also be implemented as an in-vehicle system (or a vehicle) 940 including one or more blocks of the car navigation device 920, the in-vehicle network 941, and a vehicle module 942. In other words, the in-vehicle system (or a vehicle) 940 may be provided as a device that includes the one or more components included in the processing unit 140. The vehicle module 942 generates vehicle data such as vehicle speed, engine speed, and trouble information, and outputs the generated data to the in-vehicle network 941.

3. Concluding Remarks

According to an embodiment of the present disclosure as described above, there is provided a mobile communication system for causing a plurality of eNodeBs selected by the MME to be linked. The MME determines a plurality of eNodeB to be linked on the basis of a predetermined condition, for example, positional condition, attribute of the terminal device, attribute of another terminal specified by the terminal device, or the like.

According to the embodiments of the present disclosure, it is possible to arrange the function of the application server or the cache server to an entity (e.g. eNodeB or S-GW) close to the terminal device of the mobile network. The arrangement of the functions of the application server or cache server to an entity close to the terminal device of the mobile network makes it possible to transmit data with less delay to the terminal device. In addition, the arrangement of the function of the application server or cache server to an entity close to the terminal device of the mobile network makes it possible to improve the quality of synchronization between applications running on a plurality of terminal device.

Moreover, although the example in which the communication system complies with LTE or LTE-A has been described in an embodiment of the present disclosure, the present disclosure is not limited to this example. The communication system may be, in one example, a system complying with other communication standards.

In addition, processing steps in processes of the present specification may not necessarily be executed in a time series manner in the order described in the flow diagrams or sequence diagrams. The processing steps in the processes may also be executed, in one example, in a different order from the order described in the flow diagrams or sequence diagrams, or may be executed in parallel.

Furthermore, a computer program for causing a processor (e.g., a CPU, a DSP, etc.) provided in a device (e.g., the terminal device, the base station, the control entity, or a module thereof) of the present specification to function as the device (i.e., a computer program for causing the processor to execute operations of components of the above-described device) can also be created. In addition, a recording medium in which the computer program is recorded may be provided. Moreover, a device that includes a memory storing the computer program and one or more processors that can execute the computer program (e.g., a finished product or a module for a finished product (a component, a processing circuit, a chip, or the like) may also be provided. In addition, a method including operations of one or more components of the device (e.g., the information acquisition unit and/or the control unit) is also included in the technology according to the present disclosure.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A control device including:
a control unit configured to determine a base station from among a plurality of base stations on the basis of a predetermined condition, the base station causing data on an application used by a terminal device to be linked, the terminal device wirelessly communicating with the base station; and
a notification unit configured to notify all base stations determined by the control unit that the data is caused to be linked.

(2)
The control device according to (1), further including:
an acquisition unit configured to acquire information from a terminal device that communicates with a base station,
in which the control unit determines a base station that satisfies a predetermined condition by using information acquired by the acquisition unit from the terminal device.

(3)
The control device according to (2),
in which the predetermined condition is a base station specified from the terminal device.

(4)
The control device according to (2),
in which the predetermined condition is a base station with which another terminal device linked with the terminal device wirelessly communicates.

(5)
The control device according to (1),
in which the predetermined condition is that a base station is located within a predetermined range.

(6)
The control device according to (5),
in which the predetermined condition is that a base station in which an on state and an off state can be switched is located within a predetermined range.

(7)
The control device according to (1),
in which the predetermined condition is that a base station is located within a range within which the terminal device is likely to move.

(8)
The control device according to any of (1) to (7),
in which the control unit determines a base station that causes cache data referred to by the terminal device to be linked.

(9)
The control device according to any of (1) to (7),
in which the control unit determines a base station that causes activation of an application to be linked.

(10)
The control device according to any of (1) to (7),
in which the control unit determines, depending on an application to be activated, a base station that causes activation of the application to be linked.

(11)
A base station including:
an acquisition unit configured to acquire a notification that causes data on an identical application to be linked with another base station; and
a control unit configured to cause the data to be linked with the other base station depending on a request from a terminal device on the basis of the notification acquired by the acquisition unit.

(12)
The base station according to (11),
in which the control unit causes cache data referred to by the terminal device to be linked with the other base station.

(13)
The base station according to (11),
in which the control unit causes data on an application updated depending on the request from the terminal device to be linked with the other base station.

(14)
The base station according to any of (11) to (13),
in which the control unit causes the data to be linked with the other base station peer to peer.

(15)
The base station according to any of (11) to (13),
in which the control unit causes the data to be linked with the other base station via a server device.

(16)
The base station according to (15),
in which the server device is provided outside a core network.

(17)

The base station according to (15), in which the server device is provided inside a core network.

(18)

A terminal device including:

a control unit configured to notify a core network of information on an application in which data is linked with another terminal device that communicates with a base station identical or different to or from a base station which communicates with the terminal device.

(19)

A control method including:

determining a base station from among a plurality of base stations on the basis of a predetermined condition, the base station causing data on an application used by a terminal device to be linked, the terminal device wirelessly communicating with the base station; and notifying all determined base stations that the data is caused to be linked.

(20)

A control method of a base station, the control method including:

acquiring a notification that causes data on an identical application to be linked with another base station; and causing the data to be linked with the other base station on the basis of the notification acquired by the acquisition unit.

(21)

A control method of a terminal device, the control method including:

notifying a core network of information on an application in which data is linked with another terminal device that communicates with a base station identical or different to or from a base station which communicates with the terminal device.

(22)

A computer program causing a computer to execute:

determining a base station from among a plurality of base stations on the basis of a predetermined condition, the base station causing data on an application used by a terminal device to be linked, the terminal device wirelessly communicating with the base station; and notifying all determined base stations that the data is caused to be linked.

(23)

A computer program causing a computer to execute:

acquiring a notification that causes data on an identical application to be linked with another base station; and causing the data to be linked with the other base station on the basis of the notification acquired by the acquisition unit.

(24)

A computer program causing a computer to execute:

notifying a core network of information on an application in which data is linked with another terminal device that communicates with a base station identical or different to or from a base station which communicates with the terminal device.

REFERENCE SIGNS LIST

100a, 100b terminal device
200a, 200b, 200c eNodeB
300 MME

The invention claimed is:

1. A control device comprising:

processing circuitry configured to determine at least a first base station and a second base station to hold application-related data related with an application program used by a terminal device from among a plurality of base stations based on a predetermined condition, the terminal device wirelessly communicating with at least one of the determined first and second base stations: and]

notify the determined first and second base stations to hold the application-related data such that the determined first and second base stations activate the application program before at least one of the determined first and second base stations wirelessly communicates with the terminal device using an application layer regarding the activated application program, and that an internal state of the application program is linked between the determined first and second base stations;

wherein the predetermined condition is that a base station is located within a predetermined range;

wherein the predetermined condition is that a base station in which an on state and an off state can be switched is located within a predetermined range.

2. The control device according to claim 1, wherein the processing circuitry is configured to: acquire information from the terminal device that communicates with at least one of the determined first and second base stations, determine the first and second base stations that satisfy the predetermined condition by using the information acquired from the terminal device.

3. The control device according to claim 2, wherein the predetermined condition is a base station specified from the terminal device.

4. The control device according to claim 2, wherein the predetermined condition is a base station with which another terminal device linked with the terminal device wirelessly communicates.

5. The control device according to claim 1, wherein the predetermined condition is that a base station is located within a range within which the terminal device is likely to move.

6. The control device according to claim 1, wherein the processing circuitry is configured to determine the first and second base stations that cause cache data referred to by the terminal device to be linked.

7. The control device according to claim 1, wherein the processing circuitry is configured to determine the first and second base stations that cause activation of the application program to be linked.

8. The control device according to claim 1, wherein the processing circuitry is configured to determine, depending on the application program to be activated, the first and second base stations that cause activation of the application program to be linked.

9. A control method comprising: determining, using processing circuitry, at least a first base station and a second base station to hold application-related data related with an application program used by a terminal device from among a plurality of base stations based on a predetermined condition, the terminal device wirelessly communicating with at least one of the determined first and second base stations: and notifying the determined first and second base stations to hold the application-related data such that the determined first and second base stations activate the application program before at least one of the determined first and second base stations wirelessly communicates with the terminal device using an application layer regarding the activated application program, and that an internal state of the application program is linked between the determined first and second base stations;

wherein the predetermined condition is that a base station is located within a predetermined range;

wherein the predetermined condition is that a base station in which an on state and an off state can be switched is located within a predetermined range.

10. The control device according to claim 1, wherein the application program is an application program of a synchronous network game application and the internal state includes information on where a character is located within a map of the network game application.

* * * * *